(12) United States Patent
Nazzari

(10) Patent No.: US 11,120,397 B2
(45) Date of Patent: Sep. 14, 2021

(54) MANAGEMENT TRACKING IDENTIFIER FORMAT, PROCESSING, AND DATA ASSOCIATIONS

(71) Applicant: HURU SYSTEMS LTD., Nassau (BS)

(72) Inventor: Ian A. Nazzari, Moraga, CA (US)

(73) Assignee: Huru Systems Inc., Orem, UT (US)

( * ) Notice: Subject to any disclaimer, the term of this patent is extended or adjusted under 35 U.S.C. 154(b) by 659 days.

(21) Appl. No.: 15/925,335

(22) Filed: Mar. 19, 2018

(65) Prior Publication Data
US 2018/0253684 A1 Sep. 6, 2018

Related U.S. Application Data

(63) Continuation of application No. 14/270,539, filed on May 6, 2014, now Pat. No. 9,928,479.

(60) Provisional application No. 61/819,725, filed on May 6, 2013, provisional application No. 61/936,262, filed on Feb. 5, 2014.

(51) Int. Cl.
G06Q 10/08 (2012.01)
G06Q 50/28 (2012.01)

(52) U.S. Cl.
CPC ......... *G06Q 10/087* (2013.01); *G06Q 10/083* (2013.01); *G06Q 10/0833* (2013.01); *G06Q 50/28* (2013.01)

(58) Field of Classification Search
CPC .................................................. G06Q 10/087
See application file for complete search history.

(56) References Cited

U.S. PATENT DOCUMENTS

| | | | |
|---|---|---|---|
| 6,148,291 A | 11/2000 | Radican |
| 6,422,029 B1 | 7/2002 | Boitnott |
| 6,886,748 B1 | 5/2005 | Moore |
| 7,055,741 B2 | 6/2006 | Bong et al. |

(Continued)

FOREIGN PATENT DOCUMENTS

| | | | |
|---|---|---|---|
| JP | 2003072526 A | 3/2003 |
| WO | 03038738 A1 | 5/2003 |

OTHER PUBLICATIONS

"OCT/OCV Vision Systems Improve Reject Rates and Quality Yield on Pharmaceutical Line," Vision Systems Design, Aug. 26, 2011, 5 Pages.

(Continued)

*Primary Examiner* — Allen C Chein
(74) *Attorney, Agent, or Firm* — Workman Nydegger

(57) ABSTRACT

A computing device obtains a machine-readable code encoding a group identifier, and decodes the group identifier to identify each unit identifier of each of a plurality of tracking units. Decoding includes identifying a first portion of the group identifier that identifies a first unit identifier of a first unit, and identifying a second portion of the group identifier comprising a multiplier identifying a number of the plurality of tracking units that are within the grouping. The computing device sends a request to a management service for a first user to obtain custody of the plurality of tracking units. The management service reassigns custody of the plurality of tracking units from a second user to the first user, without obtaining input from the second user. Another computing device associated with the second user updates a displayed status to indicate that the first user now has custody of the particular tracking unit.

20 Claims, 18 Drawing Sheets

(56) References Cited

U.S. PATENT DOCUMENTS

| | | | |
|---|---|---|---|
| 7,204,421 B2 | 4/2007 | Austin | |
| 7,730,325 B2 | 6/2010 | Morrow et al. | |
| 8,141,330 B2 | 3/2012 | Henkel | |
| 8,279,067 B2 | 10/2012 | Berger et al. | |
| 8,342,393 B2* | 1/2013 | Grant | G06K 19/00 |
| | | | 235/375 |
| 8,344,879 B2 | 1/2013 | Harmon et al. | |
| 8,576,095 B2 | 11/2013 | Harmon et al. | |
| 8,666,936 B2 | 3/2014 | Wallace | |
| 9,454,746 B2 | 9/2016 | Ozkan | |
| 9,928,479 B2 | 3/2018 | Nazzari | |
| 2003/0011474 A1 | 1/2003 | Ng | |
| 2003/0195749 A1 | 10/2003 | Schuller | |
| 2004/0015477 A1* | 1/2004 | Beck | A01B 79/005 |
| 2004/0024644 A1 | 2/2004 | Gui et al. | |
| 2004/0113783 A1 | 6/2004 | Yagesh | |
| 2006/0106718 A1* | 5/2006 | Spellman | G06Q 10/00 |
| | | | 705/50 |
| 2006/0189326 A1 | 8/2006 | Black, Sr. et al. | |
| 2006/0200391 A1 | 9/2006 | Taylor | |
| 2007/0008115 A1* | 1/2007 | Morhard | G08B 13/2462 |
| | | | 340/539.13 |
| 2007/0102515 A1 | 5/2007 | Windham et al. | |
| 2007/0119954 A1 | 5/2007 | Barenburg et al. | |
| 2007/0219916 A1* | 9/2007 | Lucas | G06Q 10/08 |
| | | | 705/58 |
| 2007/0239569 A1 | 10/2007 | Lucas et al. | |
| 2008/0093448 A1 | 4/2008 | de la Huerga | |
| 2009/0002173 A1* | 1/2009 | Bergsten | G06Q 10/087 |
| | | | 340/572.1 |
| 2011/0215148 A1* | 9/2011 | Grant | G06Q 50/00 |
| | | | 235/385 |
| 2012/0098664 A1 | 4/2012 | Nordin et al. | |
| 2012/0145779 A1 | 6/2012 | Bietenbeck et al. | |
| 2012/0273568 A1* | 11/2012 | Dlott | G06Q 10/063 |
| | | | 235/375 |
| 2013/0110534 A1* | 5/2013 | Iasella | G06Q 10/083 |
| | | | 705/2 |
| 2013/0117078 A1 | 5/2013 | Weik, III et al. | |
| 2013/0212398 A1 | 8/2013 | Yeap et al. | |
| 2014/0025524 A1 | 1/2014 | Sims et al. | |
| 2014/0048593 A1 | 2/2014 | Hoganson | |
| 2017/0270467 A1* | 9/2017 | Chanez | G06Q 10/08 |

OTHER PUBLICATIONS

Trimble Technology Sales Group, "Trimble Technology for Logistics", Accessed on May 6, 2014 at www.trimble.com/tsg/logistics.aspx, 2 page.
Trimble's New AllTrak System Manages Construction Asset Usage and Reduces Loss, Avaliable as early as Aug. 24, 2009, Accessed May 6, 2014 at http://investor.trimble.com/releasedetail.cfm?ReleaseIDS=404541, 2 pages.
Product Brochure: "Trimble Alltrak: Take Control of Your Assets, Improve Asset Productivity," 2009, 4 pages.
International Search Report from International PCT Application No. PCT/US14/36896, dated Mar. 27, 2015.
International Search Report from International PCT Application No. PCT/US2015/059183 dated Jan. 22, 2016.
Extended European Search Report from EP Application No. EP 15856181.1, dated Feb. 22, 2018.
European Office Communication from EP Application No. 15856181.1, dated Oct. 8, 2018, 10 pages.
"OCR/OCV Vision Systems Improve Reject Rates and Quality Yield on Pharmaceutical Line," Vision Systems Design, Aug. 26, 2011, 5 Pages.
International Search Report and Written Opinion from PCT Application No. PCT/US18/65466, dated Feb. 8, 2019.
European Search Report from EP Application No. EP 15856181, dated Feb. 13, 2018.

* cited by examiner

Inventory - Details

Applied      18/12/2013 - 17:04     Jim Brown
6514556

|  |  |  |
|---|---|---|
| Seal | Meter | Order |
|  | 62165465113415 | 6542588566 |

| Status | Code | Responsible | Cast Action |
|---|---|---|---|
|  Applied | 6514556 | John Smith | 18/12/2013 - 17:04 |
|  Available | 6514556 | Jim Brown | 18/12/2013 - 17:58 |
|  Applied | 6514556 | Sam Good | 11/16/2013 - 13:04 |
|  Applied | 6514556 | Will Samson | 12/13/2013 - 14:02 |

Inventory - Details

Available  18/12/2013 - 17:04   Jim Brown
6514556

Seal

| Status | Code | Responsible | Cast Action |
|---|---|---|---|
|  Available | 6514556 | John Smith | 18/12/2013 - 17:04 |
|  Available | 6514556 | Jim Brown | 18/12/2013 - 17:58 |
|  Available | 6514556 | Sam Good | 11/16/2013 - 13:04 |
|  Available | 6514556 | Will Samson | 12/13/2013 - 14:02 |

MANAGEMENT TRACKING IDENTIFIER FORMAT, PROCESSING, AND DATA ASSOCIATIONS

CROSS-REFERENCE TO RELATED APPLICATIONS

This application is a continuation of U.S. patent application Ser. No. 14/270,539, which was filed May 6, 2014, and which is entitled, "MANAGEMENT TRACKING IDENTIFIER FORMAT, PROCESSING, AND DATA ASSOCIATIONS," which application claims priority to, and the benefit of, U.S. Provisional Application No. 61/819,725, which was filed May 6, 2013, and which is entitled "SECURITY SEAL TRACKING AND MANAGEMENT" and U.S. Provisional Application No. 61/936,262, which was filed Feb. 5, 2014, and which is entitled "ASSET TRACKING AND MANAGEMENT." The entire contents of each of the foregoing applications are expressly incorporated by reference herein in their entireties.

FIELD OF ART

The disclosure relates to the field of asset tracking and management, and more particularly to asset tracking using a harmonizing code that is associated with an asset directly, or with a tracking unit that is attached to the asset.

BACKGROUND

In many industries, it is desirable to provide seals for articles (e.g., containers, utility boxes, valves, etc.) to ensure that the articles remain closed, un-tampered with, or otherwise secured. Generally, a seal is configured to provide an indication of when an article to which the seal has been applied has been subsequently opened, used, or altered. For example, when an article that has been sealed, it may be necessary to break the seal in order to open or access the article. Thus, a broken seal on an article may indicate that the article has been tampered with, that the article has been used without authorization, or that the contents of the article have been tampered with.

In one example, utility companies (e.g., oil and gas, electricity) commonly employ seals to protect their assets. For example, a worker installing an asset (e.g., meter, junction, transformer, etc.) may also install a seal on the asset. The seal helps the utility company detect if the asset has been opened subsequent to its initial installation. A broken seal may indicate that the asset has been tampered with in some manner, such as to alter a meter reading, or to otherwise steal utility products or services.

SUMMARY

At least some embodiments described herein relate to methods, computer systems, and computer program products for asset tracking and management. Embodiments herein enable the tracking and management of individual assets as they pass from user-to-user, through tracking one or more unique identifiers (or "harmonizing codes") that are associated with the asset throughout the asset's lifecycle. Asset tracking can be enabled through use of tracking units (e.g., security seals, security tags, etc.) that are each assigned a unique identifier and that are associated with individual assets. In some embodiments, individual assets are also assigned their own unique identifiers. Tracking can include tracking people who have interacted with the asset, tracking the physical location of the asset, tracking usage history of the asset, etc. Management can include managing installation/deployment of the asset, managing maintenance/repair of the asset, managing retirement of the asset, etc.

One example embodiment includes a computer system including an end-user device and a server. The end-user device is configured to obtain a plurality of data items from a user in connection with application of a tracking unit to an asset. The plurality of data items include a user identifier of the user who applied the tracking unit to the asset, a corresponding tracking unit identifier for the tracking unit, and an asset identifier for the asset. The end-user device sends the plurality of data items to the server computer system. Upon receipt of the data items, the server verifies that the tracking unit identifier is a valid tracking unit identifier, that the tracking unit identifier has an available status, and that the tracking unit identifier is assigned to the user. When the tracking unit identifier is verified as being valid, available, and assigned to the user, the server associates the tracking unit identifier with the asset identifier and the user identifier, and marks the tracking unit identifier as having an applied status.

Another example embodiment includes generation of an identification code. A computer system generates a group code that specifies a unit identifier and at least one multiplier specifying a number of units that are in the group. Then upon receiving confirmation that the group code was properly generated and applied to the container, the computer system generates a plurality of unit identifiers for the group.

Yet another example embodiment includes tracking chain of custody. A server computer system receives a request to take custody of a tracking identifier. The request specifies the tracking identifier and a user identifier of a user who is to take custody of the tracking identifier. The server computer system identifies a custody record of the tracking identifier. The custody record specifies a previous chain of custody for the tracking identifier. The previous chain of custody indicates that another user already has custody of the tracking identifier. The custody record is updated to indicate that the received user identifier now has custody of the tracking identifier, while preserving the previous chain of custody of tracking identifier.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 5A-5F illustrate some example mobile interfaces.

DETAILED DESCRIPTION OF VARIOUS EMBODIMENTS

Figure 1:
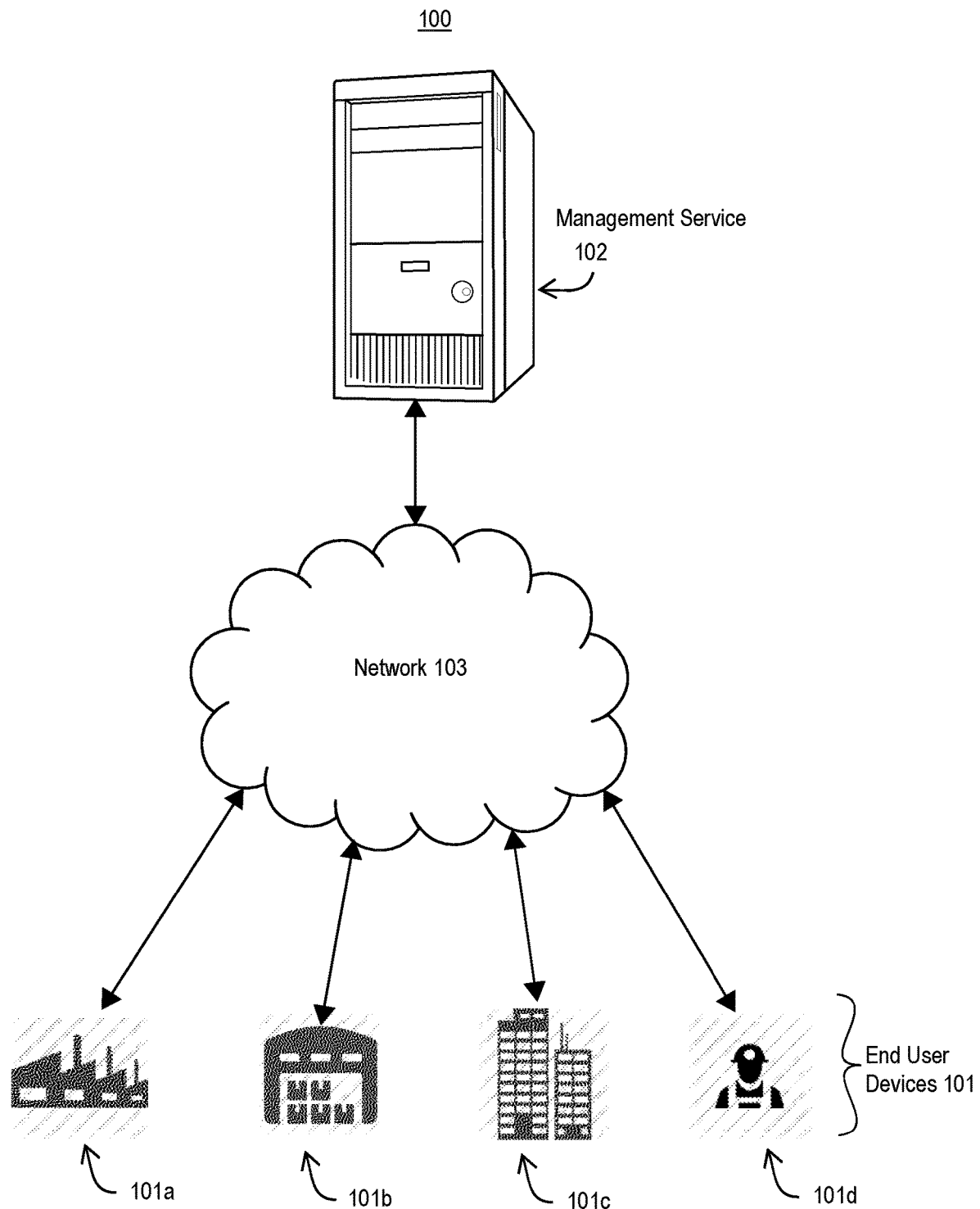
FIG. 1 illustrates an example computer architecture that facilitates asset tracking and management.

At least some embodiments described herein relate to methods, computer systems, and computer program products for asset tracking and management. Embodiments herein enable the tracking and management of individual assets as they pass from user-to-user, through tracking one or more unique identifiers (or "harmonizing codes") that are associated with the asset throughout the asset's lifecycle. Asset tracking can be enabled through use of tracking units (e.g., security seals, security tags, etc.) that are each assigned a unique identifier and that are associated with individual assets. In some embodiments, individual assets are also assigned their own unique identifiers. Embodiments include grouping identification codes (and, by extension, their associated tracking units or assets) into uniquely-trackable groups, such as pallets, boxes, bags, batches, etc. Tracking can include tracking people who have interacted with the asset, tracking the physical location of the asset, tracking usage history of the asset, etc. Management can include managing installation/deployment of the asset, managing maintenance/repair of the asset, managing retirement of the asset, etc.

For example, embodiments herein include the secure generation of unique identification codes that can be used to track physical items at an individual level. Such identification codes may be associated with individual physical assets themselves, and/or with tracking units (e.g., seals, security tags, etc.) that can be applied to physical assets. These embodiments may include a cloud-based platform for managing identification codes, and for updating and tracking the status of an associated asset and/or tracking unit through its entire lifecycle.

Some embodiments relate to the grouping of identification codes (and, by extension, their the associated asset or tracking units) into uniquely-trackable groups, such as into pallets, boxes, bags, batches, etc.

Some embodiments relate to the use of identification codes and groupings of identification codes to manage assignment of tracking units and assets to users, and to track tracking unit and asset custody.

In some embodiments, a unique identifier (whether it is placed on an asset directly or whether it is placed on a tracking unit) serves as a "harmonizing code." The harmonizing code generally stays with the asset or the tracking unit throughout the asset's/unit's lifecycle, and can be used to track the asset/unit through its lifecycle. A single asset may be associated with more than one harmonizing code (e.g., identifier placed on the asset directly, and an identifier placed on a tracking unit associated with the asset).

For example, tracking a tracking unit may begin when it is created by a manufacturer, and continue as it is transported (e.g., to a warehouse/business), as it is handled by workers, and as it is installed on an asset. Then, the tracking unit can be used to track the asset as the asset is maintained, monitored, retired, etc. The asset may also be associated with its own a unique identifier when it is created by a manufacturer, and that unique identifier may be used to track the asset throughout the asset's lifecycle. For example, identifiers may be printed, etched, molded, or otherwise placed on an asset. In addition, the unique identifier of the asset may later be associated with a unique identifier of one or more tracking units.

One will appreciate that the identifiers and tracking units described herein can be applied to a nearly infinite variety of assets. For example, they may be applied to office equipment (e.g., computers, monitors, etc.), to utility equipment (e.g., meters, transformers, etc.), to automotive equipment (e.g., car parts), to tools, etc.

This description will commence with a preliminary discussion of unique identifiers. This description will then proceed with a discussion of tracking units, and then continue with example computer architectures, user interfaces, and methodologies.

Identifiers

Identifiers may take any appropriate form, such as a numeric, alphanumeric, or other character sequence. An identifier may be visually presented on an asset or tracking unit in a human-readable form and/or a machine-readable form (e.g., a 2D or 3D barcode). An identifier may additionally or alternatively be presented in a matter that enables it to be read electronically, such as through use of a magnetic strip, a RFID tag, etc. In some embodiments, identifiers are applied to assets and tracking units in a tamper-resistant manner, such as through the use of laser etching, thermal transfer, holograms, etc.

In some embodiments, identifiers are visually presented as a human-readable identifier and/or a machine-readable identifier. For example, an identifier may be readable by a human user through an identification string (e.g., numeric, alphanumeric, symbols, etc.), and by a computer through a machine-readable code, such as a barcode, QR code etc. The machine-readable code may be an encoding of the human-readable identification string, or may be an encoding of separate data that is associated with the human-readable identification string.

In some embodiments, identifiers are protected cryptographically. Encrypted identifiers are usable to prevent unauthorized reading of identifiers, unauthorized duplication of identifiers, and/or unauthorized creation of new identifiers for use for fraudulent purposes. For example, an encrypted identifier may be one that is resistant to being read by an unauthorized third party. A read-resistant identifier may be presented in an encrypted form (e.g., by being encrypted using public key, symmetric, asymmetric, etc. encoding), so that the actual identifier or code cannot be deciphered without the proper encryption key(s) and cryptographic algorithms. Such an encrypted identifier may comprise an encrypted textual code (e.g., using combinations of numbers, letters, and/or symbols), an encrypted linear barcode, an encrypted 2D/matrix barcode (e.g., QR code, Aztec code), an encrypted 3D barcode, etc.

In another example, an encrypted identifier may be one that is resistant to being generated by an unauthorized third party. A generation-resistant identifier may be generated using a cryptographic algorithm, so that valid identifiers cannot be generated without access to the applicable cryptographic algorithms and/or encryption keys(s)—thus making it difficult for a third party to generate valid identifiers.

Combinations are also possible. For example, an identifier may be generated using a cryptographic algorithm, and then the generated identifier may be further encrypted (thus making it difficult for a third party to read the actual identifier)—thereby providing multiple layers of cryptographic protection.

In some embodiments, identifiers are generated as part of groupings. For example, identifiers may be generated so that associated assets or tracking units are logically grouped into boxes (e.g. 1000 units) that include bags (e.g., 100 units). Other groupings are also possible. For example, boxes may be grouped into pallets, and/or each bag may include trays or batches (e.g., 10 units). These groupings can be used to assign units to different parties (e.g., factories, warehouses, companies, and workers), and to enable tracking of unit custody (e.g., workers who handled an asset, a seal, or a security tag).

In some embodiments, assets or tracking units may incorporate one or more electronic transmitters or transponders, which transmit a signal that can be tracked via land-based receivers (e.g., cellular towers), aircraft, or even satellites (e.g., using the Global Positioning System (GPS) satellites, Iridium satellites, Galileo satellites, etc.). Thus, the position of assets or tracking units can be continuously tracked. Such embodiments may be of particular usefulness in the context of the transportation and shipping industries, since a container can be tracked after it is packaged to further verify that it remains free of tampering and to mitigate against the loss of containers.

Tracking Units

A tracking unit can comprise any device that is associated with a unique identifier, and that can be affixed to an asset. For example, tracking units can include seals and security tags.

As used herein, a seal is any physical device that includes a unique identifier (in human and/or machine-readable form), that can be securely placed on an asset, and that provides an indication that an article to which the seal has been applied has not been used or altered in a manner that is detectable through use of the seal. For example, a seal may include tape, wire, plastic, etc. that can be applied to an article in a manner, such that removal of the seal would alter the seal in an identifiable way. Thus, seals can comprise any device for securing the article to which the seal is attached, and may be constructed from any appropriate material (e.g., wire, tape, plastic, metal, paper, electronic circuitry, etc.). Examples of seals that may be used in connection with embodiments of the present invention can be found in one or more of the following United States Patent Applications, where are commonly owned by Applicant: U.S. Ser. No. 09/059,360, filed Apr. 14, 1998; U.S. 61/219,548, filed Jun. 23, 2009; U.S. Ser. No. 13/191,513, filed Jul. 27, 2011; U.S. 61/823,124, filed May 14, 2013; and U.S. 61/936,257, filed Feb. 5, 2014. The entire contents of each of these applications are expressly incorporated by reference herein in their entirety.

As used herein, a security tag is any other physical device can be affixed to an asset, but which may lack some of the security features of a seal. For example, a security tag may take the form of an adhesive sticker that includes the unique identifier (in human and/or machine-readable form) and that can be placed on an asset. In some embodiments, security tags may be still tamper and/or duplication-resistant, such as through the use of holograms, encryption, removal-resistance, or any other appropriate security measure.

Seals and/or security tags may comprise a "seal of authenticity" that can be used to ensure that an asset comes from an authorized source. In some embodiments, security tags are used when a lower level of security is needed with respect to protecting an asset, direct application of a code to an asset is used when a medium level of security is needed with respect to protecting an asset, and a seal is used when a higher level of security is needed with respect to protecting an asset.

For simplicity, some of the remaining disclosure is provided in the context of seals specifically. One of ordinary skill in the art will recognize, however, such references to seals may generally be applied to other tracking units (e.g., security tags) and/or assets as well.

Computer Architecture

FIG. 1 illustrates an example computer architecture 100 that facilitates security asset tracking and management using identification codes (e.g., through use of tracking units and/or direct application of identifiers to assets). Referring to FIG. 1, the computer architecture 100 includes one or more end-user devices 101 and a management service 102 that are connected to one another over (or is part of) a network 103, such as, for example, a Local Area Network ("LAN"), a Wide Area Network ("WAN"), and even the Internet. Accordingly, the end-user devices 101 and the management service 102 can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. In some embodiments, the network 103 can comprise a cellular network. In these embodiments, the end-user devices 101 may comprise a device having a cellular radio, such as a mobile telephone.

In some embodiments, the management service 102 is a web or cloud-based service that maintains a data store that includes information about identifiers, tracking units, and assets that are managed using the computer architecture 100. For example, the management service 102 can include one or more databases that store data about assets, tracking units, users, mobile devices, work requests, etc. The management service 102 can also offer one or more application programming interfaces (APIs) or web-based user interfaces for accessing functionality to generate identification codes, for managing assets, for managing tracking units, for managing users, for managing mobile devices, for processing work requests, etc. The management service 102 can also offer APIs for providing statistical data and analytics about any of the foregoing.

The end-user device(s) 101 are configured to interface with the management service 102 for generating identification codes, for updating the status of identification codes, for associating an identification code with an asset or a tracking unit, etc. For example, one or more factory end-user devices 101a may interface with the management service 102 during the code generation and tracking unit or asset creation process. In another example, one or more warehouse end-user devices 101b may interface with the management service 102 as tracking units or assets are shipped to consumer companies. In yet another example, one or more company end-user devices 101c may interface with the management service 102 as tracking units or assets are distributed within a company and to workers, and one or more worker end-user devices 101d may interface with the management service 102 as tracking units are distributed among workers and applied to assets.

In one example of an end-user device 101, a worker end-user device 101d may be used by an end-user in the field (e.g., a worker installing or reading a utility box) to apply tracking units to assets and to track tracking units and assets. In some embodiments, the worker end-user device 101d comprises a smartphone, a PDA, or other mobile device that is configured with appropriate software in the form of computer-executable instructions. Generally, the worker end-user device 101d is configured to receive one or more inputs through human user input (e.g., at a physical or virtual keyboard) or through machine scanning (e.g., using a camera to scan a barcode, using near-field communications to scan a RFID tag, etc.). Examples of information that can be gathered by the worker end-user device 101d include one or more of a user identity of a person using the mobile device, a tracking unit identifier, a work order identifier, an asset identifier, or one or more photos (e.g., of the tracking unit, the work order, or the asset).

The worker end-user device 101d is also configured to send information to and receive information from the management service 102 over the network 103. Such information may include any information gathered by the worker end-user device 101d about a tracking unit or asset. For example, the worker end-user device 101d may create a record having a plurality of data fields for an asset and/or for a tracking unit, and upload the record to the management service 102. In another example, the worker end-user device 101d may download record information from the management service 102 (or have record information pushed to it) so that a user of the worker end-user device 101d can maintain an asset, or check the status of an asset or tracking unit. Other information that can be communicated over the network 103 may include work request information. For example, the worker end-user device 101d may receive one or more work requests (e.g., work order, air waybill) from the management service 102 (either through a download or a push) for completion by a user of the worker end-user device 101d.

The computer architecture 100 can enable, for example, the use of a mobile device, such as a smartphone or PDA, to create one or more records at the management service 102 of application of tracking units to assets at the time that work is performed with respect to the assets. The management service 102 can document the history of the tracking units, along with any information pertinent to that history. For example, the management service 102 may document the identity of the person that applied the tracking unit to an asset, may document a visual confirmation that the tracking unit was applied to the asset (e.g., a photograph of the seal on the asset), may document identity information for the asset, a work order (or similar instrument, such as an air waybill), may document a geo-location where the tracking unit was applied, may document any user comments from the person applying the tracking unit, etc. The management service 102 can update such records during the lifetime of the tracking unit and/or the asset to reflect changes in status of the tracking unit and/or the asset.

APPLICABILITY

The computer architecture 100 and use of identification codes (e.g., through tracking units or direct code application) can provide centralized (and potentially near real-time) asset tracking and management, along with a documented chain of custody of assets and tracking units. The computer architecture 100 and use of identification codes herein can also provide for enhanced human-resource management, including tracking work performed, requiring work sign-off, enabling the assignment of and dissemination of work assignments, tracking potential work that needs to be performed, etc.

The computer architecture 100 and use of identification codes herein can also enable the tracking of the status of individual tracking unit and potentially groups of tracking units (e.g., boxes, bags). Tracking unit status may include an application status of the tracking unit, such as whether the tracking unit has been applied to an asset (along with the identity of the asset, when applied). Tracking unit status may also include whether the tracking unit has been lost, or whether the tracking unit is damaged/defective. Tracking unit status may also include the identity the person(s) who is/are or was/were responsible for the tracking unit. Tracking unit status may also include geo-location information, such as one or more previously known geo-location(s) of the tracking unit. Tracking unit status may include any other appropriate information, such as the date/time that particular events with respect to the tracking unit occurred.

The computer architecture 100 and use of identification codes herein can also enable the tracking of the status of any assets to which an identification is associated. Asset status may include the last known physical status of the asset, such as whether the asset has been sealed, tampered with, damaged, etc. Asset status may also include a history of work performed with respect the asset, the contents of the asset (if the asset is a container), the identity of one or more persons who have interacted with the asset, etc. Asset status may also include geo-location information for the asset (e.g., by virtue of the location of an associated seal). Asset status may include any other appropriate information, such as the date/time that particular events with respect to the asset occurred, whether the asset is lost, etc.

The computer architecture 100 and use of identification codes herein also enable user management and user accountability. For example, the computer architecture 100 and use of identification codes herein can enable the tracking of persons who apply identification codes to assets, as well as the tracking of persons who have observed, worked on, or otherwise interacted with an asset. The computer architecture 100 and use of identification codes enable the creation of personal work "signatures," which enable persons to certify that they have completed work with respect to an asset (e.g., according to a work order or an air waybill) and have applied an identification code to the asset after completing the work. For example, a signature may include documentation that tracking unit was properly applied, documentation of the asset that was interacted with, documentation of a work order that was completed, etc. The computer architecture 100 may include users having different roles, such as administrators, workers (end-users), etc.

The computer architecture 100 and use of identification codes herein may be applicable to a variety of industries. For example, the computer architecture 100 and use of identification codes may be usable by utility companies, such as oil and gas, electricity, telecommunications, television and Internet, etc. When used by utility companies, such embodiments may be used to track completion of work orders by workers, to track the sealing of a utility asset to prevent tampering and theft, to associate different seals/assets with different workers, etc. A utility company may use computer architecture 100 to track the installation and maintenance of meters, junction boxes, transformers, etc.

In another example, the embodiments herein may be usable by the transportation and shipping industries. When used by transportation and shipping companies, such embodiments may be used to in connection with fulfilling/completing an air waybill. For example, a worker may use an end-user device 101 to document packaging of items in a container, and the sealing of the container in connection with an air waybill. Further tracking of an identification code can verify whether the container has been tampered with in transit, and to verify the contents of the container.

In one use for the transportation and shipping industries, the embodiments herein may be used in connection with green zones and customs. For example, a worker may use an end-user device 101 to verify packaging and sealing of items in a container in connection with an air waybill. As part of the documentation process, the end-user device 101 can record the geo-location of the packaging/sealing. If that geo-location is within a green zone (i.e., a known secured area) then such information can be recorded in connection with the seal. Later, when a recipient of the container or a customs agency scans an identifier, they can have knowledge that the associated container was packaged/sealed in a green zone. In the case of a customs agency, the customs agency may apply a lower level of scrutiny to the container, provided the seal is still intact, than if the container was not packaged/sealed in a green zone.

A more particular discussion of applicability and use of the computer architecture 100 and use of identification codes is now presented. One of skill in the art will recognize, in view of the disclosure herein, that these examples are for illustrative purposes only, and other applications and uses are possible.

Association of Identification Code with Asset. In one example, the computer architecture 100 may be usable to set up an initial record of application of an identification code to an asset. For example, a worker may complete a work request (e.g., according to a work order, an air waybill, etc.) relative to an asset, and apply a tracking unit to the asset upon completion of the work. If a seal is used, the seal can be used to prevent tampering with the asset. The worker can use an end-user device 101 to document completion of the work request, including documenting one or more of the identity of the tracking unit used, the identity of the asset, and the identity of the work request, photos of any of the foregoing, a geo-location of the end-user device 101, etc. Documenting the identity of any of the foregoing items may comprise a machine-readable scan (e.g., barcode, RFID tag) one or more of the forgoing items, or a manual entry of any applicable identifiers.

The end-user device 101 can then send one or more data fields to the management service 102, including one or more of the identity of the tracking unit, the identity of the asset, the identity of the work request, etc. Other data may include the identity of the worker, a worker "signature" verifying that the work was performed properly, verification that the asset has passed a particular test, a geo-location of where the work was performed, a date/time stamp, one or more photos (e.g., of the seal, of the asset, of the work order, of the seal on the asset), etc. Such data can be stored at the management service 102 for later access, either through mobile devices or web interfaces.

Status Check. In another example, a worker may use the computer architecture 100 to verify the current status of an asset and/or a tracking unit. For example, a worker may use end-user device 101 to scan (or manually enter) a tracking unit identifier (if a seal/security tag is applied to the asset) and/or an asset identifier (if an identification code was directly applied to the asset). Using these identifier(s), the end-user device 101 can query the management service 102 or otherwise receive one or more applicable "custody records" for the seal/tag and/or the asset delivered to the end-user device 101.

Based on the received custody record(s), the end-user device 101 can indicate to the worker the status of the tracking unit and/or the asset. For example, the end-user device 101 can indicate if the identified tracking unit has been previously reported as missing or damaged, whether the correct tracking unit is currently applied to the asset, any relevant history information for the seal/asset, etc. If an incorrect tracking unit is applied to the asset (e.g., a tracking unit that was previously reported as missing/damaged), or if no tracking unit is applied to the asset, the worker can use the end-user device 101 to mark the tracking unit or asset as being potentially tampered with (e.g., a fraud status). In addition, the worker may apply a new seal to the asset to preserve the asset in its potentially tampered state until further work or an investigation can be performed on the asset, and document application of the replacement seal using the end-user device 101.

The end-user device 101 can send any appropriate information to the management service 102 relative to status checks. For example, the end-user device 101 may send a date/time of the status check, a worker performing the status check, a geo-location of the status check, a replacement tracking unit that was applied to the asset (along with photos or any other relevant information), etc. The management service 102 can then update its records as needed, and flag assets for additional work, if needed (e.g., such as to flag an asset as needing repair or replacement since it is a potentially tampered-with asset).

Asset Maintenance. In yet another example, a worker may use the computer architecture 100 as part of maintenance of an asset. For example, a worker may use an end-user device 101 to scan (or manually enter) a tracking unit identifier and/or an asset identifier associated with an asset on which the worker is performing maintenance. Using the tracking unit and/or asset identifier(s), the end-user device 101 can query the management service 102 or otherwise receive one or more applicable custody records for the tracking unit and/or the asset. The worker can then perform the maintenance, apply a new seal to the asset to prevent tampering, and document application of the new seal using the end-user device 101. The end-user device 101 may present the worker with any appropriate status change option, such as a tracking unit replacement option, etc. The end-user device 101 may present the worker with any appropriate maintenance options, such as calibration, repair, etc.

The end-user device 101 can send any appropriate information to the management service 102 relative to asset maintenance. For example, the end-user device 101 may send a date/time of the maintenance, a worker performing the maintenance, a geo-location of the maintenance, the new tracking unit that was applied to the asset (along with photos or any other relevant information), etc. The management service 102 can then update its records as needed.

Human Resource Management. In yet another example, a user may use the computer architecture 100 as part of human resource management. For example, the management service 102 may send one or more work requests (e.g., work order, air waybill) to a worker for performance of a task with respect to an asset. For example, a work request may direct a worker to install an asset, to package and seal a container, to perform maintenance on an asset, etc. In some embodiments, the management service 102 may send work requests to workers based on a current geo-location of the worker. For example, if a worker is in a location that has one or more assets that have been flagged as being potentially tampered with, the management service 102 may send work requests to the worker that instruct the worker to perform maintenance on the assets.

Vertical Integration. The seals and computer architecture 100 can be vertically integrated throughout an organization, to provide an end-to-end asset management solution. For example, vertical integration can include using identifiers to centrally track individual assets from manufacturing, through inventory/warehouse operations, to deployment to the field. Throughout the process, the seals can be used by business operations to manage various aspects of the assets, such as maintenance and/or repair of the asset, management of personnel that interact with the asset, retirement of the asset, etc.

For example, a unique identifier may be applied to an asset when the asset is produced (e.g., by applying an identifier during manufacturing) or processed as a new asset (e.g., by personnel applying a tracking unit). That identifier may stay with the asset during the entire lifecycle of the asset at the organization. As such, a chain of custody (i.e., who has interacted with/possessed the asset) can be maintained through tracking of the identifier as the asset is used and moved throughout the organization. In addition, the asset can be further tracked/managed by business operations personnel, such as to manage updates, maintenance, repair, retirement, personnel, etc. as they relate to the asset. Throughout the process a seal can help prevent tampering with and theft of the asset.

By applying identifiers to individual assets, a vertically-integrated organization can identify and track its assets or inventory items on a per-unit basis, potentially in real-time. Thus, an organization is enabled to track individual assets as those assets move throughout the organization, such from purchase or manufacture of the asset, through assignment of the asset to organization personnel, to deployment of the asset in the field, and retirement of the asset. In addition, the organization can, at any time, be enabled to identify a last-known geographical location of the asset and the personnel who have possessed or interacted with the asset.

In addition, when a unique tamper-resistant seal is applied to an asset, the seal acts to prevent the asset from being stolen or tampered with. By tracking the seal as the asset passes from person-to-person in a vertically-integrated organization, the seal acts to form a chain of custody of the asset. As such, if an asset goes missing or has been tampered with, the organization knows who last interacted with or possessed the asset. Furthermore, use of an encrypted seal can prevent unauthorized parties from obtaining seal information about an asset, and can prevent parties from duplicating or otherwise forging seals or tags.

The computer architecture 100 and use of identification codes herein can be used by a vertically-integrated organization to track detailed information about the lifecycle of individual assets to which identifiers are assigned (either directly or through use of a tracking unit). For example, a centrally-managed database (e.g., management service 102) may track maintenance history, maintenance schedules, repair history, update history, update schedules, and the like. As such, the computer architecture 100 and use of identification codes described herein can provide real-time status for assets that can be used to manage the maintenance, repair, and replacement of individual assets.

Tracking individual assets through unique identifiers can facilitate human resource management and labor assignments in a vertically-integrated organization. For example, many assets may require occasional check-ups, maintenance, or repairs. Using a centrally-managed database of individual assets that are tracked using unique identifiers, operations personnel can be enabled to track where assets are, when the assets were last maintained or checked on, which assets need repairs, etc. Thus, for example, when operations personnel assign field personnel to work on or check on an asset, the operations personnel can also consider what other assets are in the area or that are along the field personnel's route, and the current status of the other assets (e.g., their maintenance schedule and history, their current operating status, etc.). As such, the operations personnel can assign the field personnel to maintain or check on other assets in the area, making more efficient use of the field personnel's time.

In one example of vertical integration, an individual asset for an organization may comprise a laptop computer. When the laptop computer is purchased by the organization, a tracking unit (e.g., seal or security tag) can be attached to the computer, and a record can be created that associates the tracking unit with the computer. Each time an identifier of the tracking unit is scanned (e.g., as part of an assignment of the computer to a user, as part of system updates/maintenance, etc.), the record can be updated to reflect the current location and status of the computer. The record can then be used to track the location and custody of the computer over time, as well as track and schedule maintenance and updates for the computer, and eventually be used to remove the computer from use at the end of its life. Use of a seal on the computer can prevent tampering with the computer, such as to prevent a user from swapping out or stealing internal computer components.

In another example, an individual asset for an organization may comprise an individual livestock, such as a horse, a cow or bull, or a sheep. In this example, a seal or tag (e.g., as an ear tag, an implant, etc.) can be applied to the livestock at birth or purchase, and the seal or tag can be used to track the livestock's movements throughout its lifetime, to track its vaccinations, to track its checkups, etc. until the livestock is sold, slaughtered, or dies. In some embodiments, a livestock seal or tag can be enabled to be track-able in real-time, such as through the use of GPS, NFC, radio transmissions, etc.

Code Generation and Lifecycle Management

In view of the computer architecture 100 of FIG. 1, FIGS. 2A-2D illustrates an example process flow 200 for code generation and seal/asset lifecycle management. FIGS. 2A-2D each includes three timelines, including an activity timeline 201, a state machine timeline 202, and an ownership timeline 203. The activity timeline 201 presents the process of generation of identifier codes at a factory, application of those codes to a seal, and distribution of the seals to a warehouse, to a business, and to a worker. The state machine timeline 202 shows a status of the generated code, as recorded at a server (e.g., the management service 102). The ownership timeline 203 shows an ownership of the generated code, as recorded at the server/management service.

While the following process flow is presented in linear manner, one of ordinary skill in the art will recognize that some steps in the process flow may be performed in different orders, or in parallel. As such, the embodiments herein are not limited to the following ordering of steps.

For simplicity, FIGS. 2A-2D will be described in the context of applying identifiers to seals, and of grouping seals into bags, boxes, and pallets. However, identifiers may be applied to other tracking unit (e.g., to security tag), or to assets directly (without use of a tracking unit), and/or groupings could be modified in any appropriate manner. For example, some products may come with an identification code (e.g., QR Code, barcode, etc.) marked directly onto the product by the factory.

Figure 2A:
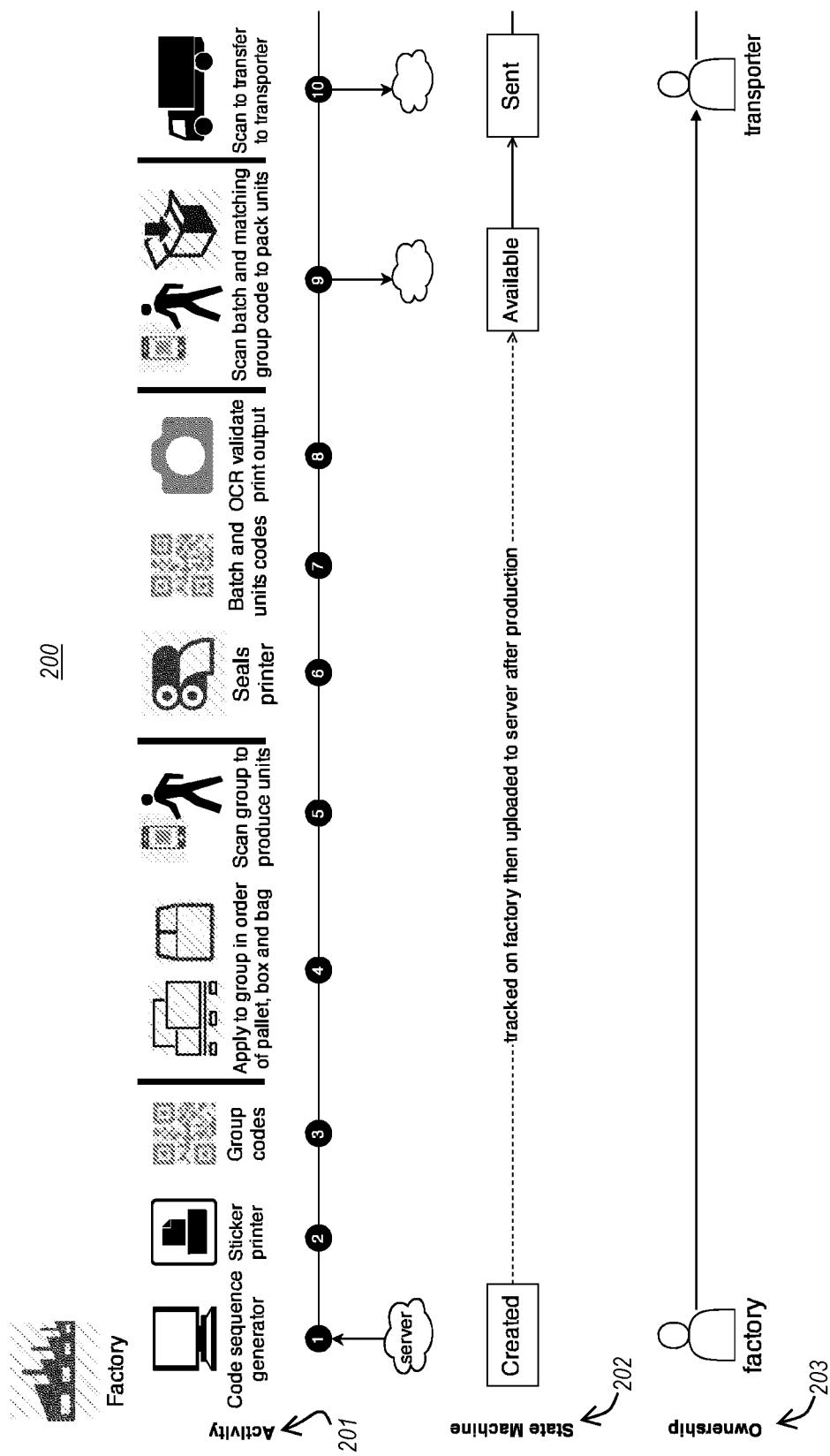
FIGS. 2A-2D illustrate an example process flow for code generation and seal/asset lifecycle management.

FIG. 2A illustrates the process flow 200 at a factory. The process flow 200 at the factory may be automated (i.e., by machines), may be performed manually (i.e., by a human worker), or may be performed using both automated and manual elements. At time (1), one or more identification codes are generated at a code sequence generator. In some embodiments, the code sequence generator is at an end-user device 101, such as a factory end-user device 101a. In other embodiments, the code sequence generator is at the server (management service 102), and its functionality is made available to a factory end-user device 101a through an API. As indicated in timelines 202 and 203, the generated code(s) are indicated at the server has having been created and as being currently owned by the factory.

In some embodiments, the generated codes are grouped by virtue of the formatting of the code. In other embodiments, the generated codes are grouped by association in a database. Groups may be nested, such there are groups and sub-groups. As mentioned previously, for example, a plurality of individual seals can be grouped into bags, and a plurality of bags can be grouped into boxes. The boxes can be further grouped onto pallets. For example, a box may contain a large number (e.g., hundreds or thousands) of seals, and bags may have a smaller number (e.g., tens or hundreds each) of seals. Other divisions are also possible, such as batches or trays (e.g., ten each) of seals. Thus, the code sequence generator can generate codes that correspond with these divisions.

In one example that involves boxes, bags, and individual seals, an identifier for a batch (e.g., pallet, box, bag) begins with the identifier of the first seal in the batch, followed by a specification (e.g., multipliers) of the sub-batches. For example, if the first seal identifier is '000000000', then the identifier for a box may be '000000000.50.100'. This box identifier indicates that the box contains 50 bags, and that each bag contains 100 seals. Carrying out the multiplication (i.e., 50*100), it is clear that this box contains 5,000 seals, which can be inferred to include individual units '000000000' through '000004999'. The identifier for the first bag may be '000000000.100', indicating that the first seal in the bag is '000000000', and that there are 100 seals in the bag. The identifiers for the 100 seals in the bag are therefore '000000000' through '000000099'. Within that same box, the identifier for another bag may be '000000100.100', indicating that the first seal in the bag is '000000100', and that there are 100 seals in the bag. The identifiers for the 100 seals in the bag are thus '000000100' through '000000199'.

One of skill in the art will recognize, in view of the disclosure herein, that use of alphanumeric unit identifiers can increase the number of identifiers that can be specified using a given number of bytes. For example, a unit identifier may take an alternate alphanumeric form such as 'AAAAA0000', AAAAB0000, AAAAC0000, etc.

As depicted in FIG. 2A, at times (2) and (3) a group code is printed. For example, a group code (e.g., '000000000.50.100' for a box, or '000000000.100' for a bag) may be printed on a sticker or on a container directly. At time (4), the sticker with the group code is placed on the appropriate container(s), such as a pallet, a box, or a bag. At time (5) the group code is scanned or otherwise entered by a worker (e.g., using a factory end-user device 101a). Scanning the code provides verification that the code was indeed generated, and that it was correctly printed and applied to a container. Once the group code is scanned, at times (6) and (7) individual unit codes are generated for each seal, and may be printed on the seals. In some embodiments, batch codes (e.g., that logically group several seals) may also be generated. For example, a bag of 100 seals may include ten batches of ten seals each. At time (8), any generated codes are scanned/OCR'd to verify proper generation and printing of the codes.

FIG. 2A also indicates that at time (9) the seals are packaged into their respective groupings. The batch/unit codes can be scanned concurrent with the seals being packaged, and the group codes can be scanned to signify completion of the packaging of a group. A chain of custody can thus be started, by recording the user (if any) who packaged the seals. The completed packaging (and the user or machine completing the packaging) can be logged at the server, and the seals can be marked as available (as indicated in timeline 202). At time (10), the packaged seals (e.g., the boxes or pallets of boxes) are scanned for transport (e.g., to a warehouse). Thus, the seals involved are marked at the server as being sent, and are now owned by the transporter that is involved in transportation to the warehouse. In some embodiments, an order code is generated in connection with the transportation to the warehouse.

Figure 2B:
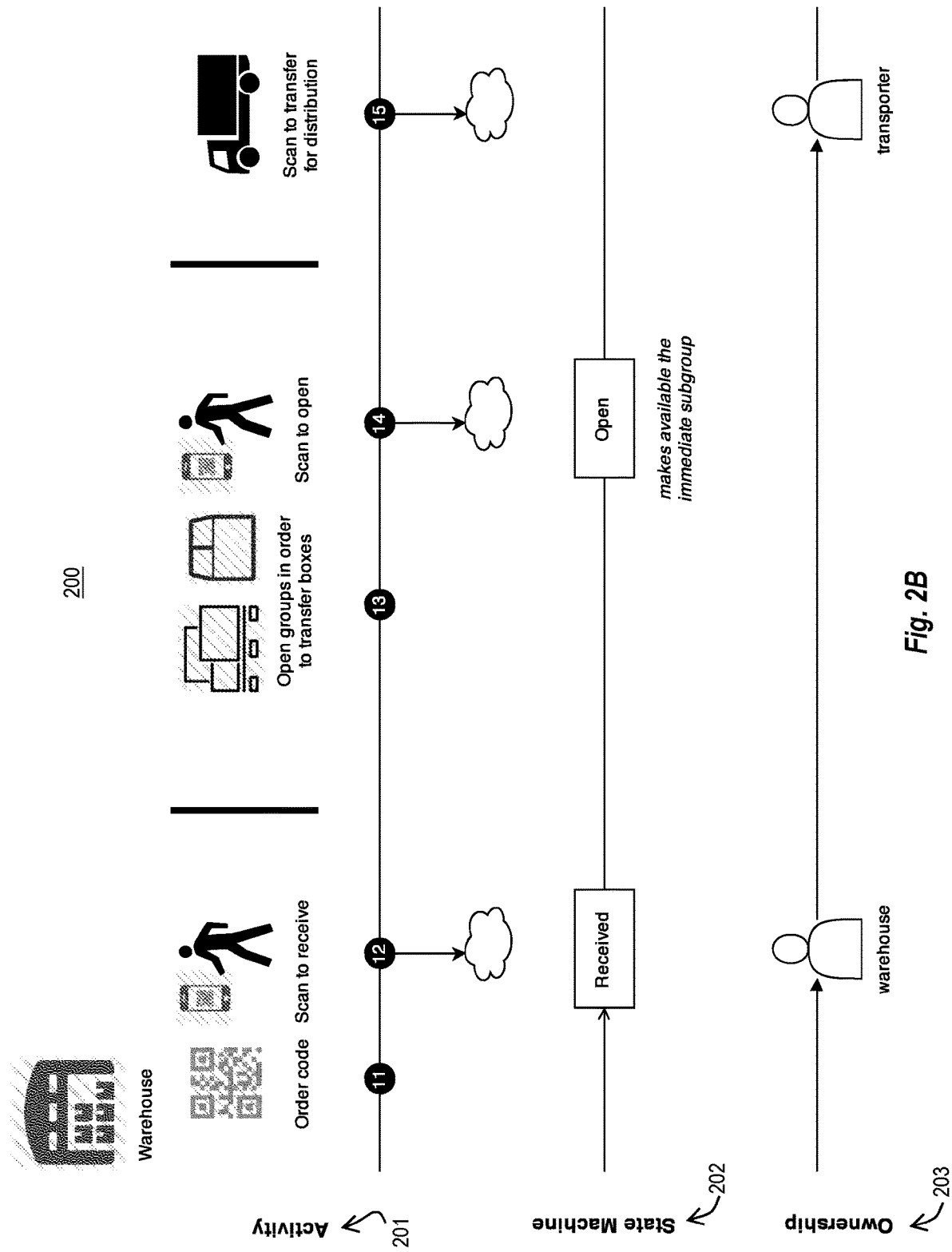

Subsequent to transportation from the factory, FIG. 2B illustrates the process flow 200 at a warehouse. At times (11) and (12), FIG. 2B illustrates that the order code (which was generated in connection with transportation of the seals) is scanned at the warehouse (e.g., using a warehouse end-user device 101b) in order to receive the seals in the order. In connection with receiving the seals, the server is updated to indicate that seals are received, with ownership of the seals being assigned to the warehouse (see timelines 202 and 203). At times (13) and (14), group codes are scanned for opening a group to transfer its sub-groups. For example, the group code for a pallet may be scanned, so that boxes within the pallet can be transported to a business. Thus, when a group code is scanned, the immediate subgroup (e.g., boxes, when a pallet group code is scanned) is also made available for scanning. As a group is opened, the action is recorded at the server (see timeline 202). At time (15), groups of seals can then scanned to transfer for distribution. For example, the group code of a box can be scanned for transfer of the box to a company. This action can be recorded at the server, and the ownership of the affected seals can be assigned to the transporter that is involved with transportation to the business. In some embodiments, an order code is generated in connection with the transportation to the business.

Figure 2C:
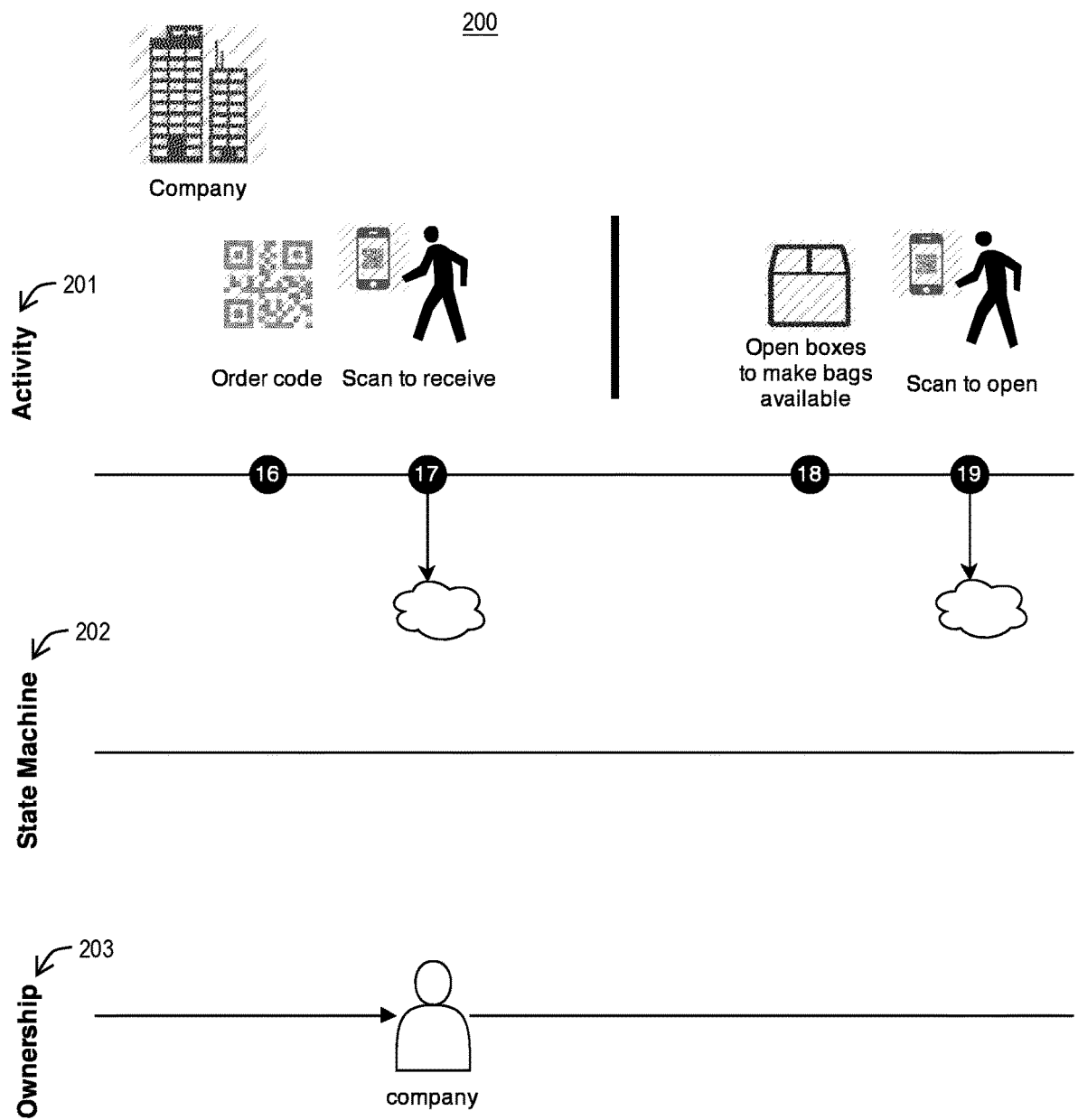

Subsequent to transportation from the factory, FIG. 2C illustrates the process flow 200 at a company. At times (16) and (17), the order code that was generated when the warehouse shipped a group of seals is scanned by a company end-user device 101c. This action is recorded at the server, and ownership of the affected seals by the company is recorded (see timelines 202 and 203). Then, at times (18) and (19), groups of seals (e.g., boxes) can be opened by scanning the group code. This marks the underlying group (e.g., bags) is being available for use. The opening of a box at time (19) is recorded at the server.

Figure 2D:
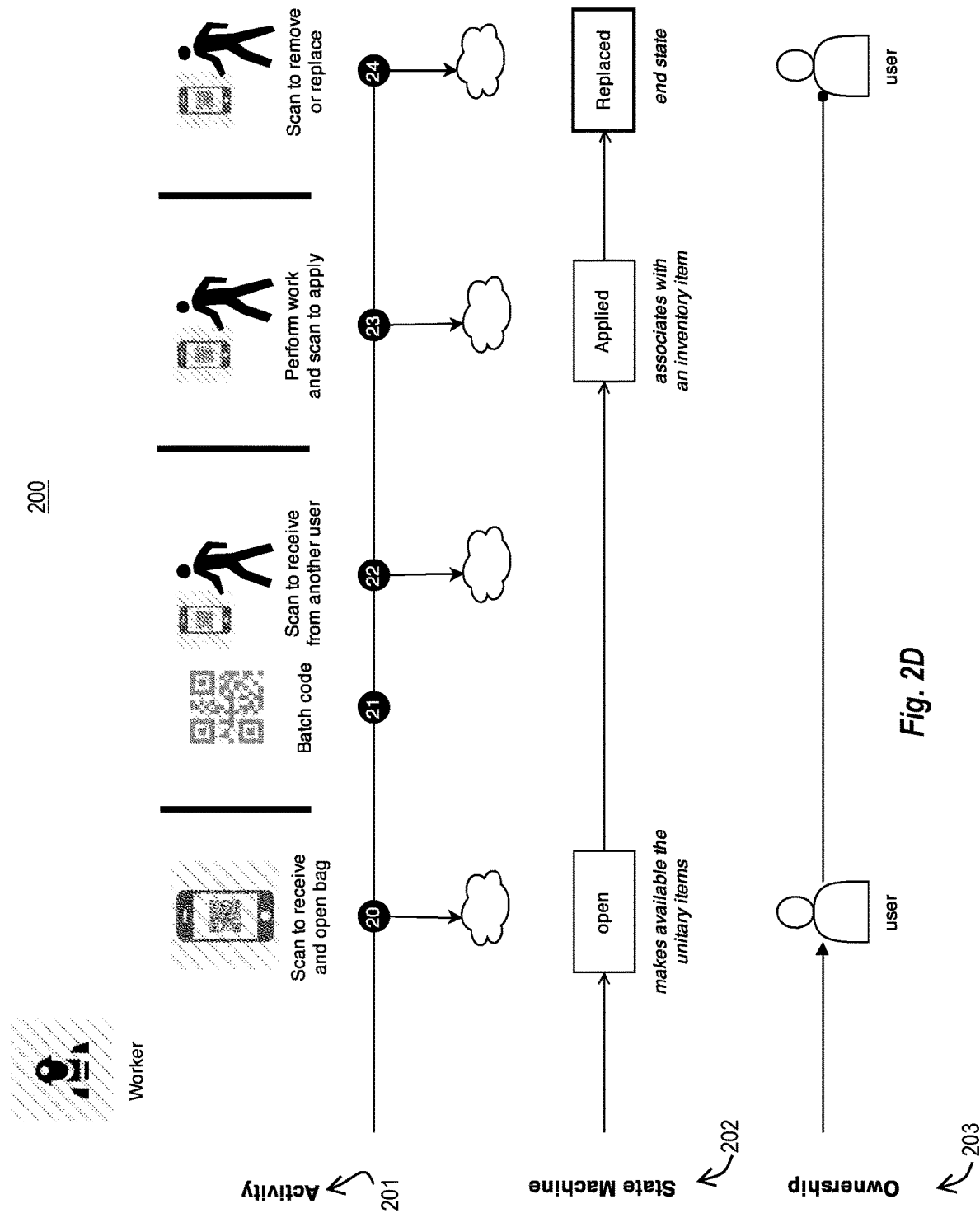

Continuing at FIG. 2D, the process flow 200 for a worker is illustrated. At time (20) a first worker scans (e.g., using a worker end-user device 101d) a group code of a bag to receive and open the bag. This action causes the seals in the bag to be made available to the first worker, and to be assigned to the first worker (see timelines 202 and 203). At times (21) and (22) FIG. 2D illustrates that a second worker may scan a batch code (e.g., a group of 10 seals from the bag) to receive the batch of seals from the first worker. This re-assignment is recorded at the server. At time (23), FIG. 2D illustrates that a worker can perform work with respect to an asset, and scan the seal's identifier code to apply the seal to the asset. This action can be recorded at the server, which records that seal as being applied to the asset. At time (24), a seal's identifier can be scanned to retire the seal, such as to replace the seal on the asset. Timelines 202 and 203 show that the seal's identifier can be marked as replaced, and the seal can be assigned to the user that scanned to seal at time (24).

One specific example of operation of FIG. 2D (process flow 200 for a worker) is now described. For example, a worker may take custody of a bag or batch of seals by scanning the group code (for a bag) or the batch code (for a batch). The worker can then perform a task with respect to an asset (e.g., such as by installing a utility meter), and apply a seal to the asset while in the field. The worker may then document the work performed and/or the act of sealing that asset at a database or repository, such as a web or cloud-based service. Such documentation may include the worker using a worker end-user device 101*d* to send a seal identifier for the applied seal, a photo of the installed utility meter along with the seal, the work order for installing the meter, etc. to the management service 102. The act of installation and sealing is recorded at the management service 102, and the utility meter can then be track throughout its lifecycle using the management service 102 and the applied seal.

In view of the foregoing discussion of FIGS. 2A-2D, one of ordinary skill in the art will recognize that the generated code for an individual item (e.g., seal) serves as a "harmonizing code" that can be used to track a seal and/or an asset throughout its entire lifecycle. As mentioned earlier, a single asset may be associated with multiple "harmonizing codes," such as one that is applied to the asset directly, and one that is associated with a tracking unit that has been applied to the asset.

This lifecycle includes creation at a factory, transportation to a warehouse, transportation to a business, and deployment of the asset or seal by the business. During this process, the code can be used to track the status of the seal/assets, and custody of the seal/asset. As discussed hereinafter, the code can also be used to track the geo-location of the seal/asset, and can be used to manage various aspects of the seal/asset—such as maintenance, repair, retirement, etc. For example, continuing the foregoing utility meter example, the seal identifier of the seal that was applied to the utility meter can serve as a "harmonizing code" that stays with the seal (and thus the meter) for its life, and that is used to track the meter throughout its entire lifecycle until retirement.

Data States for Group and Unit Identifiers

Figure 3:
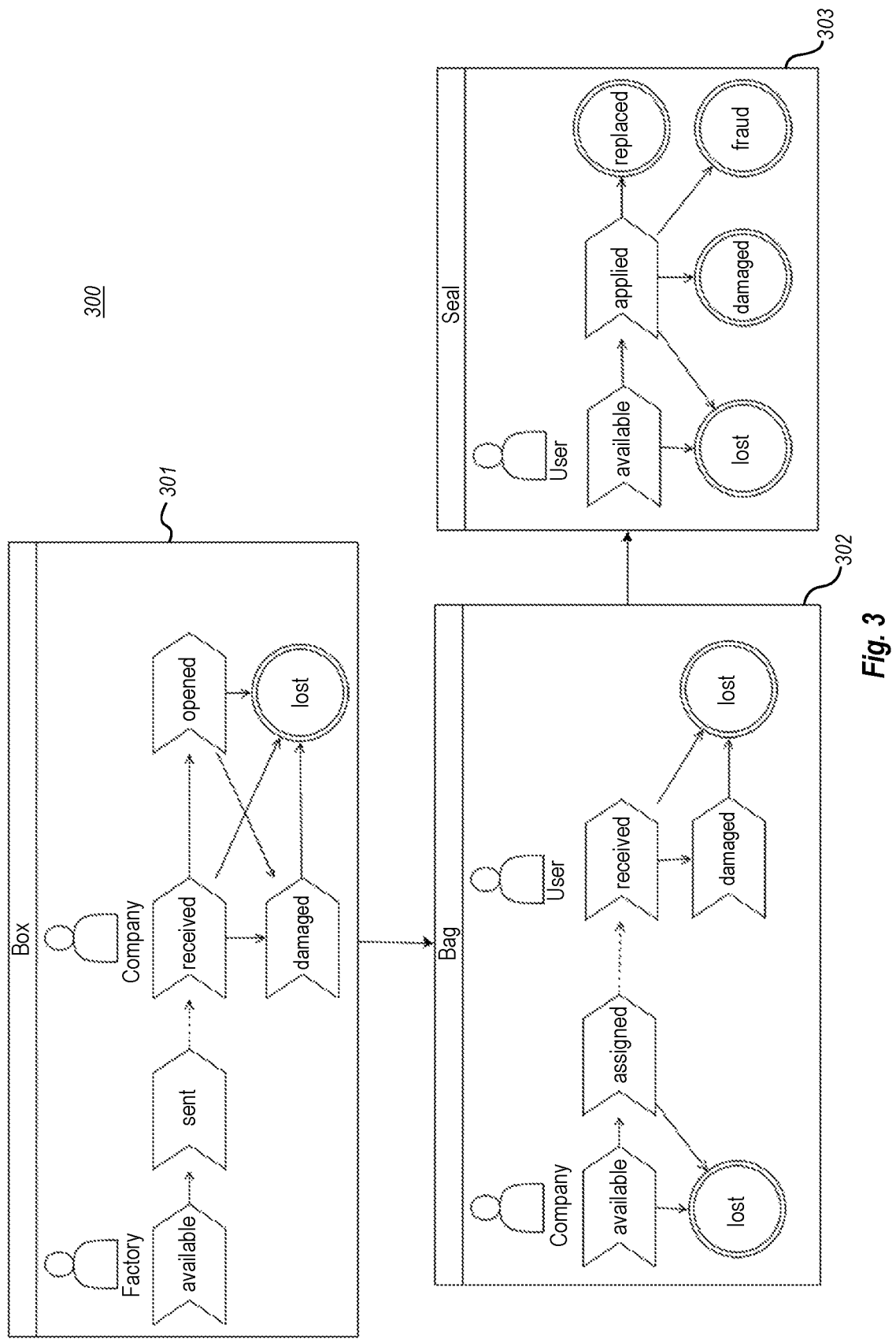
FIG. 3 illustrates some example states or statuses that may be applied to a group or unit identifier.

FIG. 3 provides some example states or statuses 300 that may be applied to a group or unit identifier (e.g., in a database at the management service 102). It is noted that these states are mere examples, and that other states may be used. In particular, FIG. 3 illustrates example states 301 for boxes, example states 302 for bags, and example states 303 for seals. Again, while FIG. 3 is presented in the context of seals, such statuses may be equally applicable to other tracking units (e.g., security tags) or to assets directly.

As depicted in the states 301 for boxes, when a factory produces a box of seals, with the box may be tagged as being available. After the box is sent to a company, it is tagged as having been sent. When received at the company, the box can be tagged as being received, opened, damaged, or lost. The states of a box can be changed a user of an end-user device 101 to scanning (or manually entering) a box group identifier, or through a user using a web service or API of the management service 102 to manage the box. Changing the status of a box may also change the status of each bag and/or each individual seal in the box.

As depicted in the states 302 for bags, a bag can be tagged as being available, assigned to a user, or lost. Such state changes can be made through a user of an end-user device 101 to scanning (or manually entering) a bag group identifier, or through a user using a web service or API of the management service 102 to manage the bag. In addition, a bag may be assigned to a user, by the user scanning (or manually entering) the bag identifier, or by through use of a web service or API of the management service 102. Once the user receives a bag, the user may subsequently tag the bag (and all seals therein that have not already been used) as being damaged or lost.

As depicted in the states 303 for seals, a user may tag an available seal as being applied or lost, such as through use of an end-user device 101. Once a seal has been applied, the user may tag a seal as being lost, damaged, replaced, or tampered with (fraud). For example, a worker performing a status check or maintenance of an asset may observe that a seal is damaged or lost, and use an end-user device 101 to mark the seal as such. In another example, a worker who has performed maintenance may seal the asset with a new seal and mark the new seal as a replacement seal. In another example, a worker who has observed that an asset was missing a seal or has an invalid seal installed thereon may install a new seal on the asset, and mark the new seal (and/or the invalid seal that was installed on the asset) as fraud. A new seal marked as fraud may be used to send a worker to "seal in the fraud," and flag the asset for subsequent maintenance or replacement. When an invalid seal has been identified (and marked as fraud) the record for the seal can be used to observe workers who have interacted with the seal and events associated with the seal to identify the source of the fraud.

Transfer

As alluded to previously, groups (e.g., boxes, bags, batches) and/or individual units may (in some embodiments) be transferred between different users. For example, workers in the field may transfer units (e.g., tracking units or assets) between one another. This may be useful in the context of seals, for example, if a worker has run out of seals, but another worker has extra seals. Each re-assignment of units is tracked at the management service 102, so that a complete chain of custody of seals is maintained. While the following transfer embodiments are presented in the context of seals, such embodiments may be equally applicable to other tracking units (e.g., security tags) or to assets directly.

In a first seal transfer embodiment, to transfer a seal (or group/batch of seals), one worker scans the seal identifier (or the group/batch identifier) with an end-user device 101, and specifies another worker as the recipient of the seal. In some embodiments, the worker receiving the seal (or group/batch) must verify/acknowledge receipt of the seal (or group/batch) for the transfer to be completed. Each user to which a seal or batch of seals was assigned is recorded at the management service 102, so that a complete chain of custody is kept.

In a second seal transfer embodiment, the worker desiring to receive a seal (or group/batch of seals) needs only scan the seal identifier (or group/batch identifier) of the seal/group/batch he wishes to receive, and the seal (or group/batch) is automatically re-assigned to that worker, with inferred authorization from the user who previously had custody of the seal (or group/batch). As such, a seal or group/batch of seals may be re-assigned directly, through action of a single user, without any further prompting or verification. For example, the user who previously had custody of a seal may not be prompted to give up custody of the seal. In one practical example, a warehouse manager who has custody of seal or group of seals may be unavailable (e.g., out to lunch). During this time, another user who needs a seal (e.g., a field person or manager) can scan a desired identifier for an item (e.g., a pallet, a box, a bag, individual unit, etc.) to have custody of the item be transferred "on the fly" to that user, allowing for free unrestricted movement of assets from user to user. During this process, entire custody of the item is recorded at the management service 102. For example, a record that the warehouse manager previously had custody of the item is preserved, in addition to a record being kept that the new user took custody of the item.

In some embodiments, a user cannot begin using seals in a new group or batch until all other seals that are assigned to the user have been accounted for. For example, before a worker can use seals from a new bag, all other seals assigned to the worker may need to be flagged as applied, lost, damaged, replaced, fraud, etc. Doing so discourages the worker from stealing seals for use in fraud. For example, since the worker must account for all seals that are not applied to assets (e.g., lost or damaged) before starting on a new batch or bag of seals, the worker cannot covertly steal seals for fraudulent use. Furthermore, the worker is encouraged to retain control of seals, and to thoroughly document the loss of a seal, since if a lost seal is found on an asset the worker may be suspected as tampering with the asset.

Application of a Tracking Unit to an Asset

Figure 4:
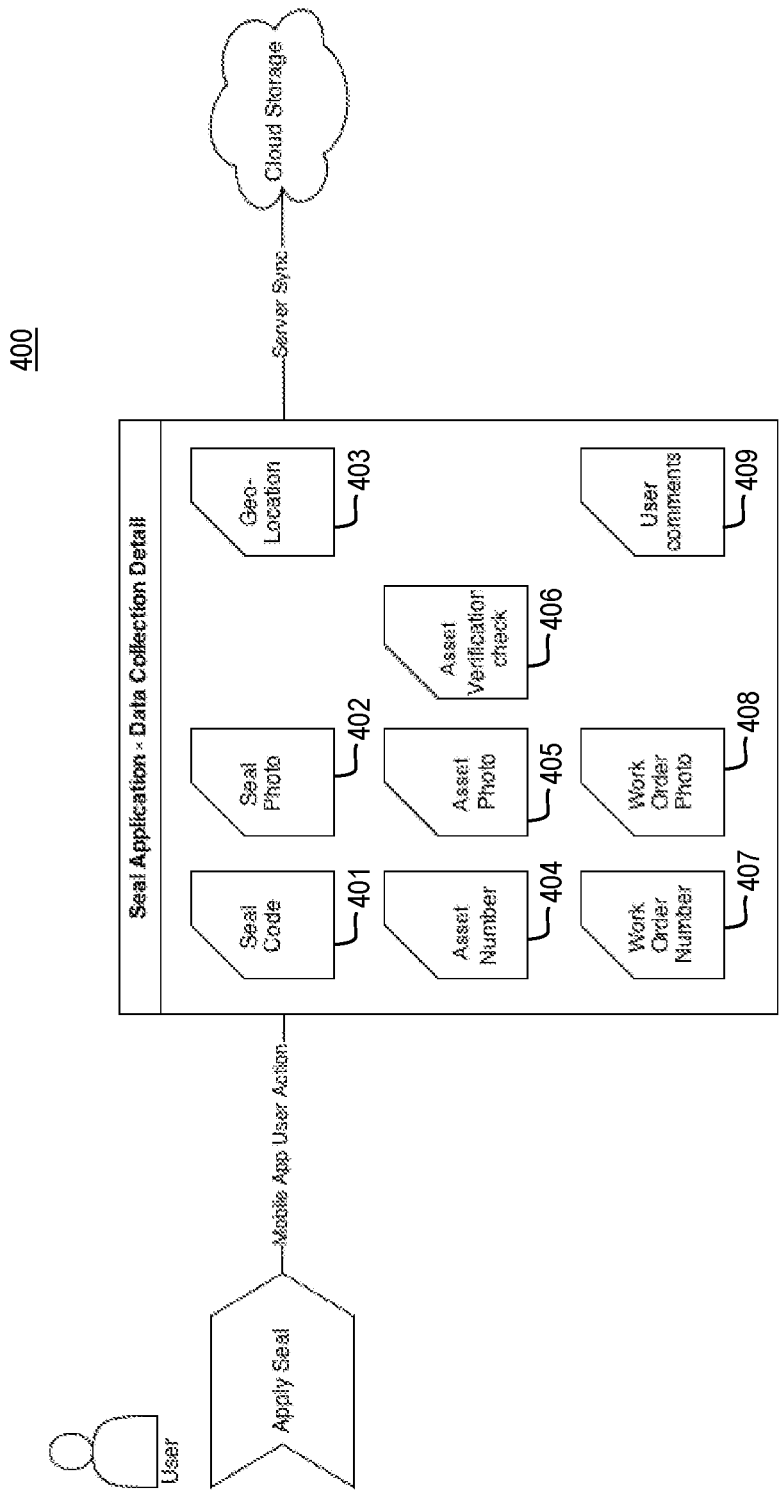
FIG. 4 illustrates a flowchart that may be used in connection with application of a tracking unit to an asset.

FIG. 4 illustrates a flowchart 400 that may be used in connection with application of a tracking unit to an asset. For example, flowchart 400 may be used as a worker applies a seal to a utility meter, as in the foregoing example discussed in connection with FIG. 2D. FIG. 4 begins when a worker applies a tracking unit to an asset. Applying the tracking unit can include the worker using an end-user device 101 to initiate a user action related to application of a tracking unit to an asset. Based on the user action, the worker may be prompted for a plurality of data items, as shown within the data collection detail of FIG. 4. In some embodiments, the user action is scanning a tracking unit identifier.

As depicted in the data collection detail of FIG. 4 and in the context of seals, the end-user device 101 may acquire a seal code 401. For example, the end-user device 101 may prompt the worker to enter a seal identifier or scan a seal barcode to obtain the seal code 401. In some embodiments, the seal identifier was acquired as part of the initial user action (i.e., the user scanning the seal identifier). In addition, the end-user device 101 may prompt the worker to capture a photograph of the seal to obtain the seal photo 404. In some embodiments, the end-user device 101 prompts the worker to obtain a photograph of the seal after it has been applied to the asset, so that the photo includes a photographic record of both the seal and the asset.

As further depicted in the data collection detail of FIG. 4, the end-user device 101 may prompt the worker to capture/enter an asset number 404, an asset photo 405, and/or an asset verification check 406. For example, the end-user device 101 may prompt the worker to enter an asset identifier or scan an asset barcode to obtain the asset number 404. In another example, the end-user device 101 may prompt the worker to capture a photograph of the asset to obtain the asset photo 405. The asset photo 405 may, in some embodiments, be the same photo as the seal photo 402. In yet another example, the end-user device 101 may prompt the worker to make one or more certifications about the asset, such as to certify that the asset passes one or more tests, as part of the asset verification check 406.

As further depicted in the data collection detail of FIG. 4, the end-user device 101 may prompt the worker to capture/enter a work order number 407 and/or a work order photo 408. For example, the end-user device 101 may prompt the worker to enter a work order identifier or scan a work order barcode to obtain the work order number 407. In another example, the end-user device 101 may prompt the worker to capture a photograph of the work order to obtain the work order photo 408. If the work order was delivered electronically through the end-user device device 101, the work order number 407 and/or the work order photo 408 may be gathered automatically or omitted.

As further depicted in the data collection detail of FIG. 4, the end-user device 101 may gather one or more other types of information, such as a geo-location 403 of the end-user device 101 and user comments 409.

FIG. 4 depicts that the mobile data collection detail is sent to cloud storage. For example, the end-user device 101 may send the mobile data collection detail to the management service 102 over the network 103. In some embodiments, the end-user device 101 sends the items of the mobile data collection detail as a single record. In other embodiments, the end-user device 101 sends the items of the mobile data collection detail individually.

In some embodiments, all mobile data is sent to the management service 102 in real-time. In other embodiments, some mobile data is sent to the management service 102 in real-time, while other data is withheld for later sending. For example, if a user is using an end-user device 101 in the field and has only a cellular connection, the end-user device 101 may send identifiers to the management service 102 over the cellular connection, but wait for a WiFi connection to send other data such as photos. In some embodiments, offline modes are supported.

Mobile Device User Interfaces

Embodiments of example mobile user interfaces of an end-user device 101 will now be described in connection with FIGS. 5A-5F. The following example mobile user interfaces represent but one example of user interfaces that can be used on the end-user device 101.

As a preliminary matter that is not depicted, a mobile interface may enable a user to login for use of the computer architecture 100. For example, a login mobile interface can prompt a user for credentials, such as a user name/e-mail address and password. Example user types that may be able to login can include worker (regular user), administrator, factory, manager, etc. A worker user may be a person in the field performing work. An administrator or manager user may have access to administrative and additional reporting functions. A factory worker may be able to create/assign boxes of seals.

Figure 5A:
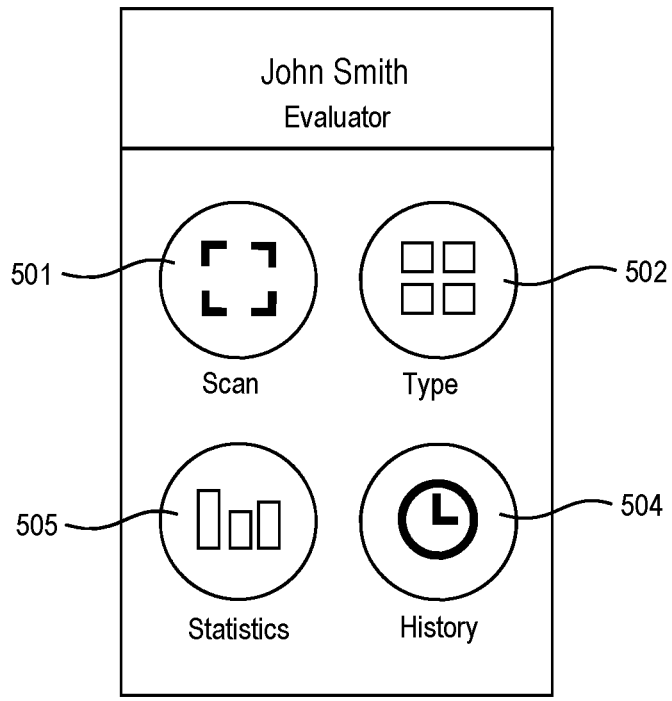

FIG. 5A illustrates an example dashboard, or main menu, mobile interface, according to one or more embodiments. As depicted, dashboard interfaces may display the user's name (e.g., John Smith) and/or the user's role, such as regular user, administrator, or evaluator. Dashboard mobile interfaces may also provide the user with options for accessing features provided by the computer architecture 100, such as scan 501, type 502, statistics 503, and history 504. A user can select the scan option 501 to initiate scanning of an identifier (e.g., barcode) of tracking unit and/or an asset. Alternatively, the user can use the type option 502 to manually enter an identifier. The scan/type options can be used in connection with initially placing a tracking unit on an asset, in connection with checking the status of a tracking unit or asset, or in connection with doing maintenance on an asset (e.g., attaching a replacement seal).

Other options may include access to actions that have been taken by a worker (e.g., a worker's current history), and verification of chain of custody. For example, a chain of custody option may present or provide confirmation of transfer of pallets, boxes, bags, seals etc. between employees.

The statistics option 503 may be used to access statistics for the current user, such as the number of work requests completed, the number of tracking unit applied, etc. The history option 504 may be used to access historical information, such as historical information for a user, a tracking unit, or an asset. The information made available to the user when accessing the statistics and history options may vary based on the user's type (e.g., evaluator or administrator).

Figure 5B:
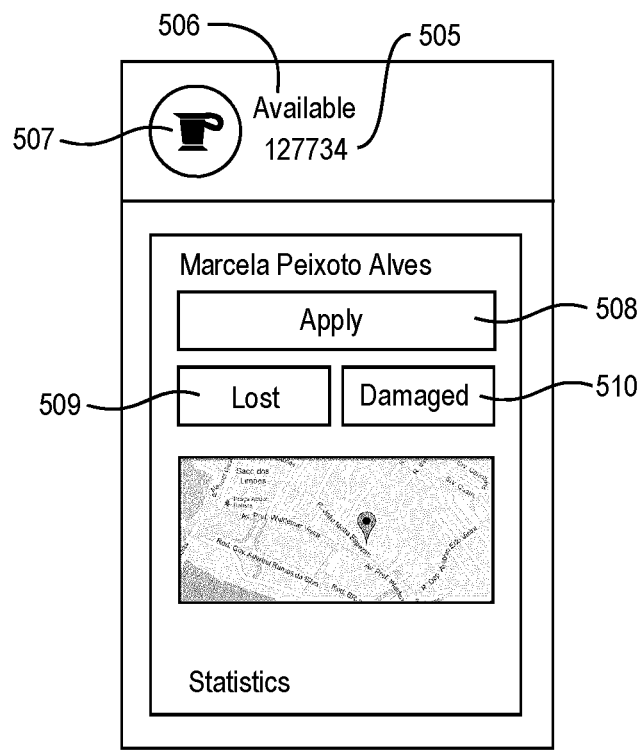

FIG. 5B illustrates an example status mobile interface, according to one or more embodiments. The status interface may be displayed after scanning or manually entering a tracking unit or group identifier. As depicted, the status interface can present the identifier 505 (e.g., 127734) and a status 506, such as the depicted available status. Other statuses may include lost, damaged, fraud, replaced, etc.

The status interface may also present the person responsible for the tracking unit or group of tracking units (e.g., Marcela Peixoto Alves). The status interface may also indicate a type 507 of the identifier that was scanned (e.g., seal, bag, box). The status interface may also present options for changing status, such as the depicted apply 508, lost 509, and damaged 510 buttons.

As depicted, the status interface may also present the location of the tracking unit or group of tracking unit using a map, an address, coordinates, etc. The status interface may present the location of the tracking unit or group as the location of a mobile device the last time the tracking unit was scanned by the mobile device, and may present any other applicable historical information for the seal or group.

Figures 5C, 5D:
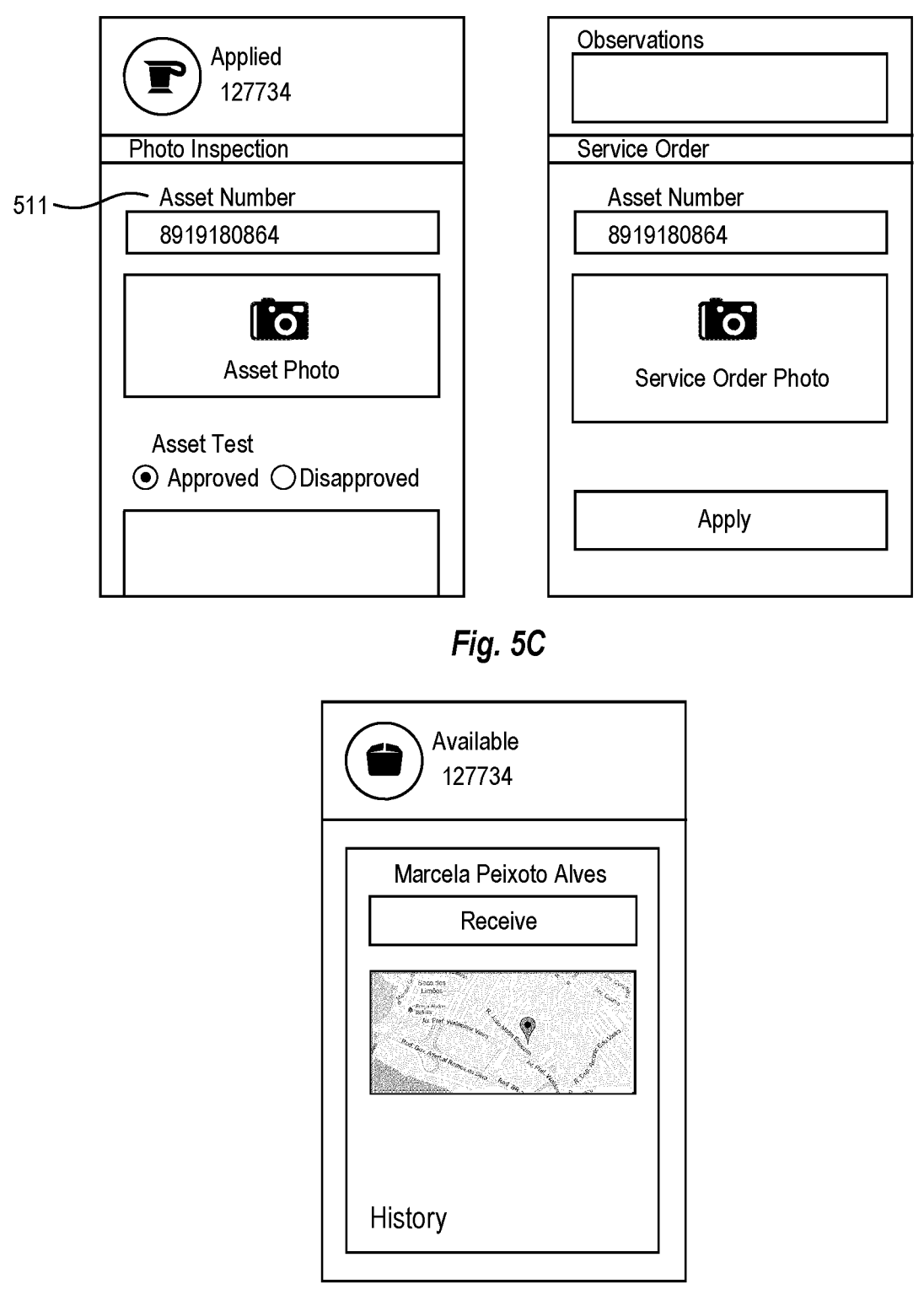

FIG. 5C illustrates some example tracking unit application mobile interfaces, according to one or more embodiments. Such user interfaces may be used when applying a tracking unit to an asset (e.g., a meter, as in the depicted example), and may appear after selecting the apply option 508 in the tracking unit status mobile interface of FIG. 5B.

As depicted in the left interface, tracking unit application interfaces may present the tracking unit identification number (i.e., 127734), and may update the tracking unit status, so that it is shown as being applied. Tracking unit application interfaces may also provide a prompt 511 for the identification number of the asset. Tracking unit application interfaces may also enable the user to provide or capture photo(s) of the asset, the tracking unit, the tracking unit as applied to the asset, etc. Tracking unit application interfaces may also prompt the user to enter the result (e.g., approved or disapproved) of an asset test.

As depicted in the right interface, tracking unit application interfaces may provide a prompt for user observations/comments. Tracking unit application interfaces may also provide a prompt for service order information, such as a work order number and/or photo. When an apply option is selected, the tracking unit application interfaces save a record for later submission to the management service 102, or may actually submit the record.

FIG. 5D illustrates an example tracking unit receipt mobile interface, according to one or more embodiments. Tracking unit receipt mobile interfaces may present the status of the tracking unit or group of tracking units (e.g., bag, box) that are being received, such as the depicted available status. As depicted in FIG. 3, other statuses may include sent, received, opened, damaged, lost, etc. Tracking unit receipt mobile interfaces may present the range of tracking units in a grouping (e.g., the depicted 1280020-1281020), the last known location of the tracking unit or grouping, a history of the tracking unit or grouping, etc. Tracking unit receipt mobile interfaces may be presented in response to a first user assigning tracking unit to a second user, or in response to a user scanning a tracking unit or group identifier to receive the tracking unit or group of tracking units.

Figures 5E, 5F:
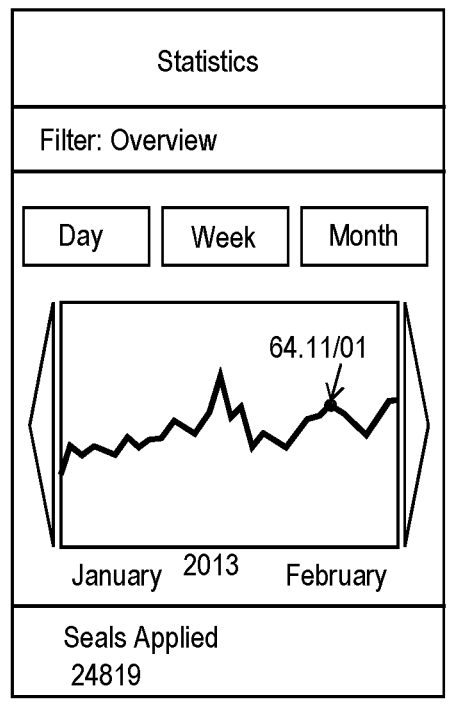

FIG. 5E illustrates an example history mobile interface, according to one or more embodiments. History interfaces may be presented to a user after selecting the history option 504 from the dashboard interface of FIG. 5A. History interfaces may list the most recent actions of the user, such as in chronological order. For example, the depicted history interfaces lists boxes, bags, and tracking units according to statuses such as sent, received, opened, available, and applied. History interfaces may also categorize actions by synchronization status (e.g., pending or done) with the management service 102. History interfaces may provide a synchronization option (e.g., the depicted circular arrows) for initiating a synchronization operation.

FIG. 5F illustrates an example statistics mobile interface, according to one or more embodiments. Statistics interfaces may be presented to a user after selecting the statistics option 503 from the dashboard interface of FIG. 5. Statistics interfaces may present any statistics that are applicable to the user of the mobile device. For example, an evaluator (regular user) may be presented with statistics about the tracking units he or she has applied, while an administrator may be presented with statistics about tracking units applied across multiple users, bags, boxes, etc. As depicted, statistics interfaces may present statistics according to time periods, such as by day, week, or month. Statistics interfaces may provide for filtering, analytics, counts, or any other applicable functionality relative to statistical analysis and presentation.

Web User Interfaces

Embodiments of web user interfaces presented by the management service 102 will now be described in connection with FIGS. 6A-6D. The following example web user interfaces represent but one example of user interfaces that can be presented by the management service 102. While the web user interfaces that are depicted primarily present activities that have occurred with respect to assets and tracking units, web user interfaces may also be used for applying tracking units to assets—much like the mobile user interfaces.

Web interfaces can include a login user interface, which enables a user to login to the management service 102. A login web interface may provide analogous functionality to the login mobile interface described previously. For example, the login web interface can prompt a user for a username/e-mail address and password. Example user types that may be able to login can include worker (regular user), administrator, factory, manager, etc.

Figure 6A:
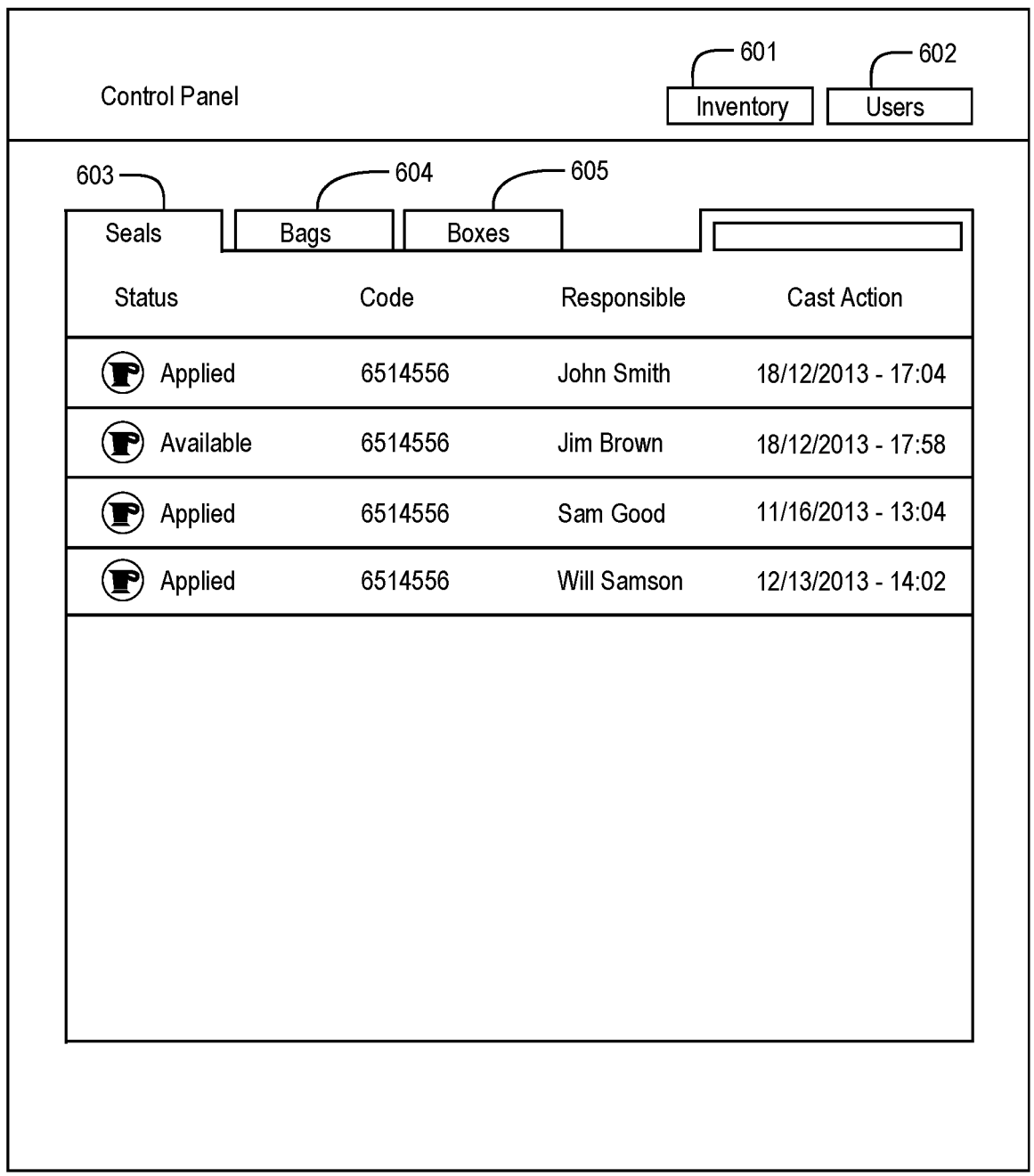
FIGS. 6A-6D illustrate some example web interfaces.

FIG. 6A illustrates an example control panel web interface. Control panel interfaces may present information about inventory items (e.g., tracking units, bags, and boxes), as well as users. For example, inventory 601 and user 602 interface controls can enable selection between display of inventory and users. The inventory items may be divided according to type, including seals (tracking units) 603, bags 604, and boxes 605. One or more data items associated with each tracking unit may be selectable to retrieve further details, to make transfers or assignments, etc.

In the embodiment depicted in FIG. 6A, the tracking unit (seals) tab 603 has been selected. The control panel interface displays different tracking units, including their type and status, the identifier or code, the responsible user, and the date/time of the last action. If the bags tab 604 is selected, the control panel may present data that is applicable to bags, such as type and status, identifier or code, responsible user, and date/time of the last action. Selection of the box tab 605 would result in a user interface that presents similar data relative to boxes.

Figure 6B:
Figure 6B:
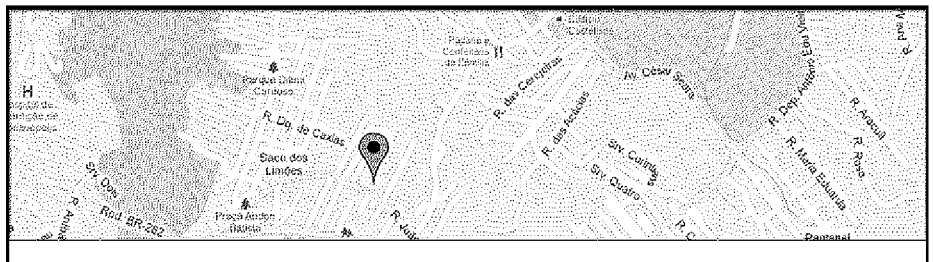
Figure 6B:
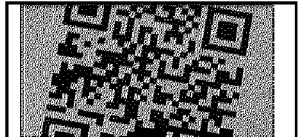
Figure 6B:
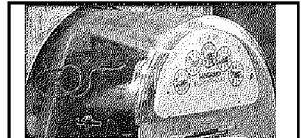
Figure 6B:
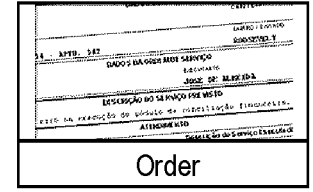
Figure 6B:
Figure 6B:
Figure 6B:
Figure 6B:

FIG. 6B illustrates an example inventory details web interface, according to one or more embodiments. Inventory details interfaces may present details about an inventory item (e.g., a tracking unit, a bag, or a box), including a status of the item, a type of the item, an identification number of the item. FIG. 6B illustrates inventory details for a tracking unit. As depicted, tracking unit inventory details may include last scanned location of the tracking unit, a photograph of the tracking unit, a photograph of the asset to which the tracking unit is applied, an asset number, a photograph of the work order, a work order number, etc. Tracking unit inventory details may also include a history of the tracking unit, such as the bag and box from which the tracking unit originated, a custody history of the tracking unit, etc.

Figure 6C:
Figure 6C:
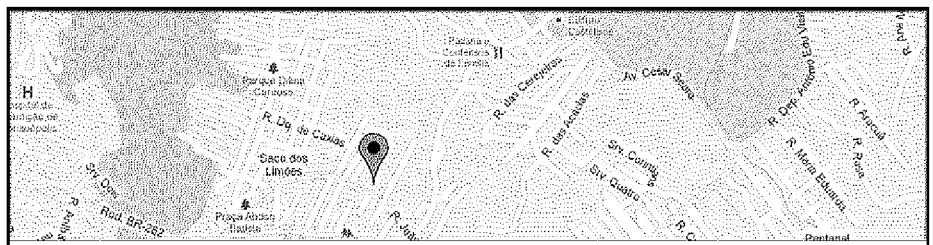
Figure 6C:
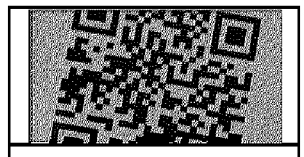
Figure 6C:
Figure 6C:
Figure 6C:
Figure 6C:

FIG. 6C illustrates an inventory details web interface for a bag. As depicted, bag details may include bag status and identity, the last scanned location of the bag, a photograph of the bag, and a history of the bag (e.g., custody history of the bag, and the box to which the bag belongs. The inventory details interface for the bag may include a transfer option (e.g., the depicted right arrow) that can be used to transfer responsibility of the bag to another user. The inventory details interface for the bag may include a split option (e.g., the double arrows) that can be used to split a bag, and assign a portion of tracking units in the bag to another user. For example, the split option may enable a user to transfer tracking units having a certain numeric range to another user.

Figure 6D:

FIG. 6D illustrates an example bag splitting dialogue web interface. As depicted, the bag splitting dialogue displays the range of tracking unit identifiers in the bag (e.g., 920020-911020), and enables specification of one or more users to whom tracking units should be assigned, as well as a range of tracking unit identifiers that are to be assigned each user.

Other control panel web interface for users may display details applicable to users, such as name, account type, and the date/time of the last user action. Such interfaces may include one or more options to create a new user. In addition, user details web interfaces may present the seals, bags, and even boxes that are assigned to a user. Each inventory item assigned to or interacted with by a user can be selected for additional detail/administration. User details web interfaces can also present a history of the last actions taken by the user.

Methodologies

Embodiments will now be described in the context of computer-implemented methods. Each of these methods is presented in view of the foregoing description and drawings. One of ordinary skill in the art will recognize that the individual acts in the methods may, in some implementations, be implemented in different orders than those presented, and that the methods may be varied in an appropriate manner in view of the disclosure herein.

Figure 7:
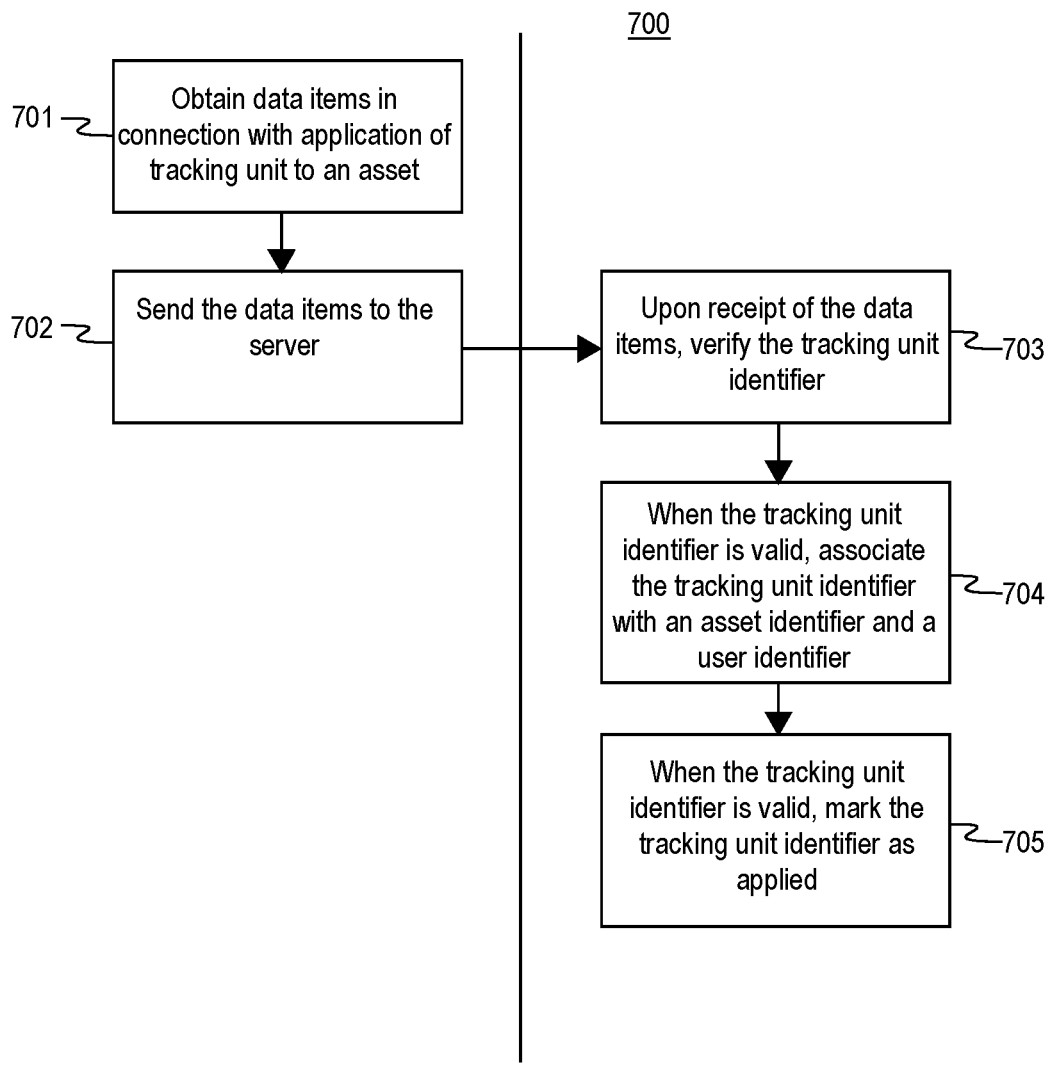
FIG. 7 illustrates a flow chart of an example method for tracking unit management and asset assignment.

FIG. 7 illustrates a flow chart of an example method 700 for seal management and asset assignment. As depicted, the method 700 includes acts that are performed at a server computer system (e.g., the management service 102) and at an end-user device (e.g., worker end-user device 101d) that are configured to communicate with one another (e.g., over network 103). Examples of mobile user interfaces that may be used in connection with method 700 are presented in FIGS. 5A-5F.

Method 700 includes an act 701, at an end-user device, of obtaining data items in connection with application of a tracking unit to an asset. Act 701 can comprise obtaining a plurality of data items from a user in connection with application of a tracking unit to an asset, the plurality of data items including: a user identifier of the user who applied the tracking unit to the asset, a corresponding tracking unit identifier for the tracking unit, and an asset identifier for the asset. For example a worker end user device 101d can be used in the field by a worker in connection with the worker applying a tracking unit to an asset (e.g., a utility meter, a container, etc.). In connection with applying the tracking unit to the asset, the worker can use the end user device 101d to scan a tracking unit identifier of the tracking unit. In response, the worker end user device 101d can prompt the user to supply identification of the asset to which the tracking unit was applied, a photo of the asset, etc. Examples of data that may be gathered are presented in FIG. 4.

Method 700 also includes an act 702, at the end-user device, for sending the data items to the server. Act 702 can comprise sending the plurality of data items to the server computer system. For example, after gathering applicable data, the worker end user device 101d can upload any appropriate data to the management service 102, including for example the tracking unit identifier, the asset identifier, the identity of the user, etc.

Method 700 also includes an act 703, at a server, for upon receipt of the data items, verifying the tracking unit identifier. Act 703 can comprise, upon receipt of the plurality of data items from the end-user device, verifying that the tracking unit identifier is a valid tracking unit identifier, that the tracking unit identifier has an available status, and that the tracking unit identifier is assigned to the user. For example, the management service 102 can verify that the tracking unit is valid (i.e., properly generated as per FIG. 2A), is in an available state, and is assigned to the user, as per FIG. 3.

Method 700 also includes an act 704, at the server, for when the tracking unit identifier is valid, associating the tracking unit identifier with an asset identifier and a user identifier. Act 704 can comprise, when the tracking unit identifier is verified as being valid, available, and assigned to the user, associating the tracking unit identifier with the asset identifier and the user identifier. For example the management service 102 can update a database to reflect assignment of the tracking unit identifier to the asset identifier. Such a record can comprise a custody record that is used to provide accountability for the user with respect to the asset. Such a record can also be used to track the asset throughout its lifecycle (e.g., maintenance, repair, updates, retirement, etc.). Such a record can also be used to detect fraud with respect to the asset. For example, if another tracking unit is subsequently found to be on the asset, the asset can be presumed to have been tampered with.

Method 700 also includes an act 705, at a server, for when the tracking unit identifier is valid, marking the tracking unit identifier as applied. Act 705 can comprise, when the tracking unit identifier is verified as being valid, available, and assigned to the user, marking the tracking unit identifier as having an applied status. For example the management service 102 can update a record of the tracking unit identifier to reflect an applied status (as per FIG. 3).

Figure 8:
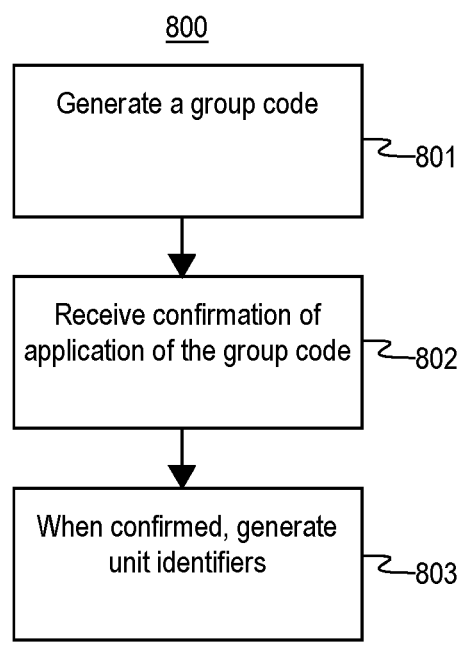
FIG. 8 illustrates a flow chart of an example method for generating an identification code.

FIG. 8 illustrates a flow chart of an example method 800 for generating an identification code. The method 800 may include acts that are performed at a server computer system (e.g., the management service 102), in combination with an end-user device (e.g., worker end-user device 101d).

Method 800 includes an act 801 of generating a group code. Act 801 can comprise generating a group code, the group code specifying a unit identifier and at least one multiplier specifying a number of units that are in the group. For example, the management service 102 or an end-user device 101 can generate a group code as discussed above in connection with FIG. 2A. For example, a group code may specify a unit identifier and a multiplier, separated by a character such as a dot, a dash, an asterisk, etc. As discussed in connection with FIG. 2A, a group code may include multiple multipliers, to create sub-groups. For example, a group identifier for a box may specify a first multiplier for a number of bags in the box, and a second identifier for a number of tracking units in a bag.

Method 800 also includes an act 802 of receiving confirmation of application of the group code. Act 802 can comprise receiving confirmation that the group code was properly generated and applied to a container. For example, FIG. 2A shows that a group code is printed and place on the container (e.g., box), and then is scanned or otherwise read (e.g., by optical character recognition (OCR)) to verify that the group code was properly produced and that it was applied to the container.

Method 800 also includes an act 803 of when confirmed, generating unit identifiers. Act 803 can comprise, upon receiving confirmation that the group code was properly generated and applied to the container, generating a plurality of unit identifiers for the group. For example, FIG. 2A shows that once a group code has been scanned, unit codes can be produced.

The method 800 can ensure that when group and unit codes are generated and corresponding units are produced, that every code/unit is accounted for during the production process. In addition, the group and unit identifiers can be assigned to a user at their creation, thereby ensuring custody of a tracking unit from the time that it is assigned a valid identifier.

Figure 9:
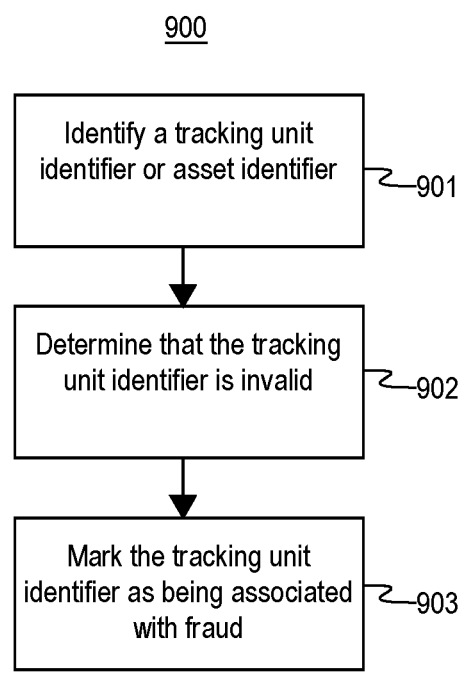
FIG. 9 illustrates a flow chart of an example method for managing a tracking unit.

FIG. 9 illustrates a flow chart of an example method 900 for managing a tracking unit. The method 900 may include acts that are performed at a server computer system (e.g., the management service 102), in combination with an end-user device (e.g., worker end-user device 101d).

Method 900 includes an act 901 of identifying a tracking unit identifier and an asset identifier. Act 901 can comprise identifying a tracking unit identifier and an asset identifier, the tracking unit identifier comprising an identifier for a tracking unit that is currently affixed to the asset. For example, a worker using a worker end-user device 101d may scan a tracking unit that has been applied to an asset, such as a utility box. Upon scanning the end-user device 101d may send the tracking unit identifier to the management service 102 for verification.

Method 900 also includes an act 902 of determining that the tracking unit identifier is invalid. Act 902 can comprise determining that the tracking unit identifier is an invalid identifier with respect to the asset identifier. For example, based on receiving the scanned tracking unit identifier, the management service 102 can determine that the tracking unit is not properly associated with the asset. Such a determination may be made because the tracking unit has previously been reported as lost or damaged, because the tracking unit is marked as being available, because the tracking unit has been marked as being associated with a different asset, etc. Method 900 also includes an act 903 of marking the tracking unit identifier as being associated with fraud. Act 903 can comprise, based on the tracking unit identifier being an invalid identifier with respect to the asset identifier, marking the tracking unit identifier as being associated with fraud. For example, the management service can update a status of the tracking unit identifier as fraud (see FIG. 3). The fraud status of the tracking unit can indicate that the asset to which the tracking unit was applied may have been tampered with.

Figure 10:
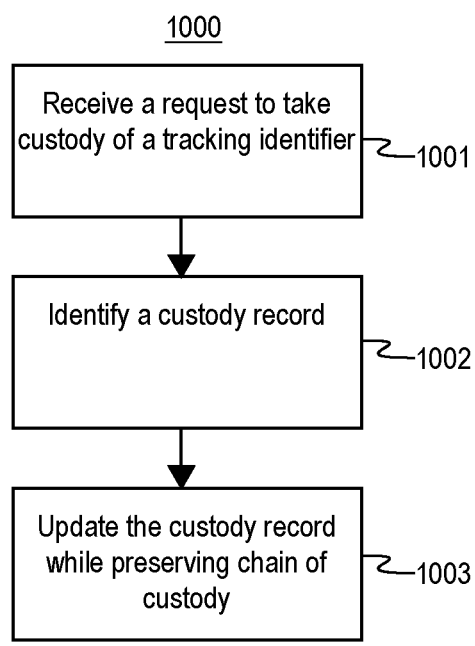
FIG. 10 illustrates a flow chart of an example method for tracking chain of custody.

FIG. 10 illustrates a flow chart of an example method 1000 for tracking a chain of custody. The method 1000 may include acts that are performed at a server computer system (e.g., the management service 102), in combination with an end-user device (e.g., worker end-user device 101d).

Method 1000 also includes an act 1001 of receiving a request to take custody of a tracking identifier. Act 1001 can comprise receiving a request to take custody of a tracking identifier, the request specifying the tracking identifier and a user identifier of a user who is to take custody of the tracking identifier. For example, a user using an end-user device 101 may scan a seal, a box, a pallet, a bag, or an asset itself to obtain a tracking identifier. The end-user device 101 can then send the tracking identifier and a user identifier of the user using the end-user device 101 to the management service 102 as a request to change custody, and the management service 102 can receive the request.

Method 1000 also includes an act 1002 of identifying a custody record. Act 1002 can comprise identifying a custody record of the tracking identifier, the custody record specifying a previous chain of custody for the tracking identifier, the previous chain of custody indicating that another user already has custody of the tracking identifier. For example, the management service 102 can identify a custody record for the tracking identifier that is stored at the management service 102. The custody record can include a previous chain of custody of the tracking identifier. The chain of custody may indicate that the tracking identifier is currently assigned to another user. The chain of custody may also include one or more other users who had previous chain of custody.

Method 1000 also includes an act 1003 of updating the custody record while preserving chain of custody. Act 1003 can comprise updating the custody record to indicate that the received user identifier now has custody of the tracking identifier, while preserving the previous chain of custody of tracking identifier. For example, the management service 102 can update the identified custody record to indicate the received user identifier now has custody of the tracking identifier. Such an update may comprise appending or prepending the user identifier to a list, adding a record, creating a new object, or any other appropriate mechanism for adding a user to a chain of custody while preserving a previous chain of custody. The management service 102 may also send confirmation to the end-user device 101 that user identifier is now associated with the tracking identifier.

When the tracking identifier is associated with a batch or group, method 1000 may also include updating a chain of custody of each unit within the batch or group to indicate that the received user identifier now has custody of a corresponding tracking identifier of the unit. For example, when a user takes custody of a pallet, box, or bag, the user takes custody of each sub-group and individual unit in the pallet, box, or bag.

The embodiments described herein can greatly improve the use of tracking unit (e.g., seals and security tags), and can greatly enhance asset tracking and management. In particular, use of an identifier as a "harmonizing code" can enable tracking a tracking unit from its creation at a factory to its destruction or retirement, and can enable tracking an asset from application of a tracking unit to the asset, to retirement of the asset.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media includes recordable-type storage devices, such as RAM, ROM, EEPROM, solid state drives ("SSDs"), flash memory, phase-change memory ("PCM"), optical disk storage, magnetic disk storage or other magnetic storage devices, or any other physical storage medium which can be used to store program code in the form of computer-executable instructions or data structures, and which can be accessed by a general-purpose or special-purpose computer system.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computing device, comprising:
   one or more processors;
   a display device;
   one or more hardware input devices; and
   one or more computer-readable media having stored thereon computer-executable instructions that are executable by the one or more processors to cause the computing device to perform at least the following:
   display, at the display device, a first user interface control which, when selected, causes the computing device to obtain a machine-readable code;
   based on selection of the first user interface control, obtain, at the one or more hardware input devices, a first machine-readable code that encodes a group identifier, the group identifier (i) identifying a grouping of a plurality of tracking units that includes a particular tracking unit, and (ii) being structured such that a corresponding unit identifier of each of the plurality of tracking units within the grouping is identifiable based only on the group identifier;
   decode, at the one or more processors, the group identifier to identify each unit identifier of each of the plurality of tracking units, by at least (i) identifying a first portion of the group identifier that identifies a first unit identifier of a first unit in the grouping of tracking units, (ii) identifying a second portion of the group identifier comprising a multiplier identifying a number of the plurality of tracking units that are within the grouping, and (iii) identifying a range of unit identifiers for the plurality of tracking units, the range of unit identifiers starting with the first unit identifier and ending with a second unit identifier, the second unit identifier identified using the multiplier;
   display, at the display device, (i) an identity of at least a subset of the plurality of tracking units that includes the particular tracking unit, (ii) an identity of a second user who has custody of the particular tracking unit, and (iii) a second user interface control which, when selected, causes the computing device to obtain custody of the plurality of tracking units on behalf of a first user associated with the computing device; and
   based on selection of the second user interface control, send a request to a management service for the first user to obtain custody of the plurality of tracking units; and
   wherein based on the request to the management service:
     the management service reassigns custody of the plurality of tracking units from the second user to the first user, without obtaining input from the second user; and another computing device associated with the second user updates a displayed status of at least the particular tracking unit to indicate that the first user now has custody of the particular tracking unit.

2. The computing device of claim 1, wherein the computer-executable instructions are also executable by the one or more processors to cause the computing device to obtain the identity of a second user who has custody of the particular tracking unit from the management service.

3. The computing device of claim 1, wherein the management service comprises a plurality of computing devices.

4. The computing device of claim 1, wherein reassigning custody of the plurality of tracking units comprises updating a documented chain of custody of plurality of tracking units.

5. The computing device of claim 4, wherein updating the documented chain of custody of plurality of tracking units comprises updating a custody record at one or more computing devices.

6. The computing device of claim 5, wherein the custody record is updated at a plurality of computing devices.

7. The computing device of claim 1, wherein the computer-executable instructions are also executable by the one or more processors to cause the computing device to, display, at the display device, the identity of a first user as having custody of the particular tracking unit based on the request to the management service.

8. The computing device of claim 1, wherein the multiplier specifies at least (i) a first number specifying a number of sub-groupings within the grouping of the plurality of tracking units, and (ii) a second number specifying a number of tracking units that are within each sub-grouping, and wherein the second unit identifier is identified by adding a product of the first number and the second number to the first unit identifier.

9. A method, implemented at a computing device that includes one or more processors, a display device, and one or more hardware input devices, the method comprising:
displaying, at the display device, a first user interface control which, when selected, causes the computing device to obtain a machine-readable code;
based on selection of the first user interface control, obtaining, at the one or more hardware input devices, a first machine-readable code that encodes a group identifier, the group identifier (i) identifying a grouping of a plurality of tracking units that includes a particular tracking unit, and (ii) being structured such that a corresponding unit identifier of each of the plurality of tracking units within the grouping is identifiable based only on the group identifier;
decoding, at the one or more processors, the group identifier to identify each unit identifier of each of the plurality of tracking units, by at least (i) identifying a first portion of the group identifier that identifies a first unit identifier of a first unit in the grouping of tracking units, (ii) identifying a second portion of the group identifier comprising a multiplier identifying a number of the plurality of tracking units that are within the grouping, and (iii) identifying a range of unit identifiers for the plurality of tracking units, the range of unit identifiers starting with the first unit identifier and ending with a second unit identifier, the second unit identifier identified using the multiplier;
displaying, at the display device, (i) an identity of at least a subset of the plurality of tracking units that includes the particular tracking unit, (ii) an identity of a second user who has custody of the particular tracking unit, and (iii) a second user interface control which, when selected, causes the computing device to obtain custody of the plurality of tracking units on behalf of a first user associated with the computing device; and
based on selection of the second user interface control, sending a request to a management service for the first user to obtain custody of the plurality of tracking units; and
wherein based on the request to the management service:
the management service reassigns custody of the plurality of tracking units from the second user to the first user, without obtaining input from the second user; and
another computing device associated with the second user updates a displayed status of at least the particular tracking unit to indicate that the first user now has custody of the particular tracking unit.

10. The method of claim 9, further comprising obtaining the identity of a second user who has custody of the particular tracking unit from the management service.

11. The method of claim 9, wherein the management service comprises a plurality of computing devices.

12. The method of claim 11, wherein reassigning custody of the plurality of tracking units comprises updating a documented chain of custody of plurality of tracking units.

13. The method of claim 12, wherein updating the documented chain of custody of plurality of tracking units comprises updating a custody record at one or more computing devices.

14. The method of claim 13, wherein the custody record is updated at a plurality of computing devices.

15. The method of claim 9, further comprising displaying, at the display device, an identity of the first user as having custody of the particular tracking unit based on the request to the management service.

16. A computer program product comprising one or more hardware storage devices having stored thereon computer-executable instructions that are executable by one or more processors to cause a computing device to perform at least the following:
display, at a display device, a first user interface control which, when selected, causes the computing device to obtain a machine-readable code;
based on selection of the first user interface control, obtain, at one or more hardware input devices, a first machine-readable code that encodes a group identifier, the group identifier (i) identifying a grouping of a plurality of tracking units that includes a particular tracking unit, and (ii) being structured such that a corresponding unit identifier of each of the plurality of tracking units within the grouping is identifiable based only on the group identifier;
decode, at the one or more processors, the group identifier to identify each unit identifier of each of the plurality of tracking units, by at least (i) identifying a first portion of the group identifier that identifies a first unit identifier of a first unit in the grouping of tracking units, (ii) identifying a second portion of the group identifier comprising a multiplier identifying a number of the plurality of tracking units that are within the grouping, and (iii) identifying a range of unit identifiers for the plurality of tracking units, the range of unit identifiers starting with the first unit identifier and ending with a second unit identifier, the second unit identifier identified using the multiplier;
display, at the display device, (i) an identity of at least a subset of the plurality of tracking units that includes the particular tracking unit, (ii) an identity of a second user who has custody of the particular tracking unit, and (iii) a second user interface control which, when selected, causes the computing device to obtain custody of the plurality of tracking units on behalf of a first user associated with the computing device; and based on selection of the second user interface control, send a request to a management service for the first user to obtain custody of the plurality of tracking units; and wherein based on the request to the management service:
- the management service reassigns custody of the plurality of tracking units from the second user to the first user, without obtaining input from the second user; and
- another computing device associated with the second user updates a displayed status of at least the particular tracking unit to indicate that the first user now has custody of the particular tracking unit.

17. The computer program product of claim 16, wherein reassigning custody of the plurality of tracking units comprises updating a documented chain of custody of plurality of tracking units.

18. The computer program product of claim 17, wherein updating the documented chain of custody of plurality of tracking units comprises updating a custody record at one or more computing devices.

19. The computer program product of claim 18, wherein the custody record is updated at a plurality of computing devices.

20. The computer program product of claim 16, wherein the computer-executable instructions are also executable by the one or more processors to cause the computing device to, display, at the display device, the identity of a first user as having custody of the particular tracking unit based on the request to the management service.

* * * * *